United States Patent
Berns et al.

(10) Patent No.: US 9,626,388 B2
(45) Date of Patent: Apr. 18, 2017

(54) METADATA AUTOMATED SYSTEM

(71) Applicant: TransMed Systems, Inc., Cupertino, CA (US)

(72) Inventors: Brian Berns, Bethesda, MD (US); Christopher Mazzanti, Germantown, MD (US); Richard McUmber, Chevy Chase, MD (US); Jeremy Miller, Apex, NC (US)

(73) Assignee: TransMed Systems, Inc., Cupertino, CA (US)

( * ) Notice: Subject to any disclaimer, the term of this patent is extended or adjusted under 35 U.S.C. 154(b) by 529 days.

(21) Appl. No.: 14/020,517

(22) Filed: Sep. 6, 2013

(65) Prior Publication Data

US 2015/0074149 A1    Mar. 12, 2015

(51) Int. Cl.
*G06F 17/30* (2006.01)
*G06Q 10/06* (2012.01)

(52) U.S. Cl.
CPC .. *G06F 17/30292* (2013.01); *G06F 17/30563* (2013.01); *G06Q 10/06* (2013.01)

(58) Field of Classification Search
None
See application file for complete search history.

(56) References Cited

U.S. PATENT DOCUMENTS

| 6,363,353 | B1 | 3/2002 | Chen |
| 6,377,934 | B1 | 4/2002 | Chen et al. |
| 6,604,104 | B1 | 8/2003 | Smith |
| 7,181,450 | B2 | 2/2007 | Malloy et al. |
| 7,596,573 | B2 | 9/2009 | O'Neil et al. |
| 7,610,300 | B2 | 10/2009 | Legault et al. |
| 7,844,570 | B2 | 11/2010 | Netz et al. |
| 7,853,621 | B2 | 12/2010 | Guo |
| 7,882,144 | B1 | 2/2011 | Stolte et al. |
| 8,024,305 | B2 | 9/2011 | Chowdhary et al. |
| 8,244,735 | B2 | 8/2012 | He et al. |
| 8,266,186 | B2 | 9/2012 | Dettinger et al. |
| 8,311,975 | B1 | 11/2012 | Gonsalves |
| 8,402,038 | B1 | 3/2013 | Braun et al. |
| 8,412,671 | B2 | 4/2013 | Sayal et al. |
| 8,738,569 | B1 * | 5/2014 | Choi ............... G06F 17/303 707/619 |
| 2003/0233365 | A1 | 12/2003 | Schmit et al. |
| 2004/0193633 | A1 | 9/2004 | Petculescu et al. |
| 2004/0194031 | A1 * | 9/2004 | Hays ............... G06F 17/30994 715/200 |
| 2005/0074806 | A1 * | 4/2005 | Skierczynski ......... G06F 19/24 435/6.13 |
| 2006/0195492 | A1 | 8/2006 | Clark et al. |
| 2007/0050394 | A1 * | 3/2007 | Sterling ............ G06F 17/30292 |
| 2007/0288172 | A1 | 12/2007 | Aronow et al. |

(Continued)

FOREIGN PATENT DOCUMENTS

EP    2040180 A1    3/2009

*Primary Examiner* — Tyler Torgrimson
(74) *Attorney, Agent, or Firm* — Robert Crownover

(57) ABSTRACT

A method can include: providing a schema definition language defining trait observations linked to an entity and the trait observations grouped together in a module with metadata; generating physical tables for the module and the entity having a link therebetween based on at least one of the trait observations; and populating the physical tables with data in accordance with the metadata.

20 Claims, 15 Drawing Sheets

(56) References Cited

U.S. PATENT DOCUMENTS

| | | |
|---|---|---|
| 2008/0077656 A1 | 3/2008 | Broda |
| 2008/0208620 A1 | 8/2008 | Karkanias et al. |
| 2012/0005241 A1 | 1/2012 | Ortel |
| 2014/0142961 A1* | 5/2014 | Luter .................... G06F 19/366 705/2 |

* cited by examiner

METADATA AUTOMATED SYSTEM

FIELD OF THE INVENTION

Embodiments of the invention relate generally to computer databases and, more particularly, facilitating the management of data structures, including their definition and creation, modification, transformation and population.

BACKGROUND OF THE INVENTION

The automated processing of information has been an enormous benefit to businesses because it has greatly increased the effectiveness and efficiency of decision makers at every point in a decision path. Every enterprise regardless of whether it is a government, commercial business or not-for-profit organization has the operational necessity to manage information.

This information is used to treat patients, acquire customers, input orders, ship product, bill customers, collect invoices, pay employees and vendors, order product, audit inventory and maintain records of transactions between employees, customers and suppliers, for example, in the case of a commercial business.

In the normal course of events, information is acquired, processed and consolidated utilizing software, computer hardware and digital networks in accordance with each organization's internal operational model. Unfortunately, the automated processing of information is fraught with many debilitating problems preventing the useable, timely, and cost effective integration, standardization, and reporting of data.

One previous approach focused on constructing enterprise data warehouses to collect consolidated and standardized data from an entire organization. The typical enterprise data warehouse requires operational data from many sources to be extracted, transformed, and loaded into a third normal form Operational Data Store database which is again extracted, transformed, and loaded into a star and snowflake data vault database. The data vault database can then be loaded into data marts, each dedicated to a particular department or function.

Each database in the enterprise data warehouse formation and functioning process must be designed, maintained, and populated with a custom Extract Transform Load (ETL) function. Furthermore, all stages in the development and use must be completed, in some form, before the organization is able to generate reports and begin to realize benefits from the enterprise data warehouse.

While an enterprise data warehouse achieves standardized data that is centrally managed for an entire organization, this comes at a very high cost. The resources required to implement a comprehensive enterprise data warehouse can be prohibitive to all but a very select few, as monetary costs can be astronomical. Even when monetary resources are not the limiting factor, the time to build and implement an enterprise data warehouse is commonly measured in years.

Another shortcoming of enterprise data warehousing stems from the enterprise data warehouse focus on decision support applications, which emphasize summarized information. An inherent disadvantage to these systems is that transaction details about the customer's identity are lost. Enterprise data warehouses exhibit shortcomings when applied to applications such as customer data analysis. Customer data analysis is a decision support analysis that correlates data to customers' activities, events, transactions, status and the like. Summarized information usually loses the detail level of information about customer identity, limiting the usefulness of enterprise data warehousing approaches in these applications.

Other approaches focus on creating department focused data marts directly from an organizations operational data. Department focused data marts only need to incorporate the data relevant to a single department. Because of this, department focused data marts can be much smaller.

Due to the smaller size department focused data marts generally take fewer resources in terms of time and money to build; however, these benefits also come at a steep cost. Department focused data marts are not centrally managed and do not have consistent standards in terms of quality or data formats.

When department focused data marts are created, the inconsistent standards prevent integration across the organization. Also, since each department focused data mart is created without an overarching plan the total amount of resources invested for each department to have a data mart can be substantially higher than creating a single well planned enterprise data warehouse. The resources to maintain inconsistent department focused data marts can also be much higher than maintaining a single enterprise data warehouse.

Currently, there is no comprehensive solution that resolves the problem of providing useable, timely, and cost effective integration, standardization, and reporting of data. This need has been long felt in the industry.

Prior developments have not taught or suggested any solutions to overcome all of the limitations described above, and thus, solutions to overcome these limitations have long eluded those skilled in the art.

SUMMARY OF THE INVENTION

The claimed invention is directed to methods, articles of manufacture, and systems that utilize a schema definition language having metadata for defining traits linked to entities and the traits grouped together in modules. It is contemplated that the schema definition language is utilized to generate physical tables for the modules and the entities having a links therebetween and based on the traits. The physical tables can be populated with data conforming to the metadata.

It is further contemplated that schema definition language can be referenced to locate the physical tables and determine whether the physical tables for the modules or the entities includes a selected trait. In the same vein, the schema definition language can be referenced to locate the physical tables and determine whether the physical tables include a subsequent selected trait only if the physical tables include the selected trait.

It is further contemplated that one-hop linkages can be determined from the schema definition language if the traits are grouped within the same module as a selected trait. It is further contemplated that the entities can be classified into a matching cohort or a non-matching cohort based on whether a clinical pattern matches the traits associated with the entities.

It is further contemplated that a report data definition can reference the schema definition language to include the modules if the traits associated with the modules are included in the report data definition. It is further contemplated that the physical tables can include longitudinal and non-longitudinal data associated with the modules and the entities, respectively.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the accompanying drawings.

It is to be noted, however, that the accompanying drawings illustrate only typical embodiments of this invention and are therefore not to be considered limiting of its scope, for the invention may admit to other equally effective embodiments. Within the accompanying drawings, similar references are intended to refer to like or corresponding parts, and in which.

DETAILED DESCRIPTION OF THE PREFERRED EMBODIMENTS

Figure 1:
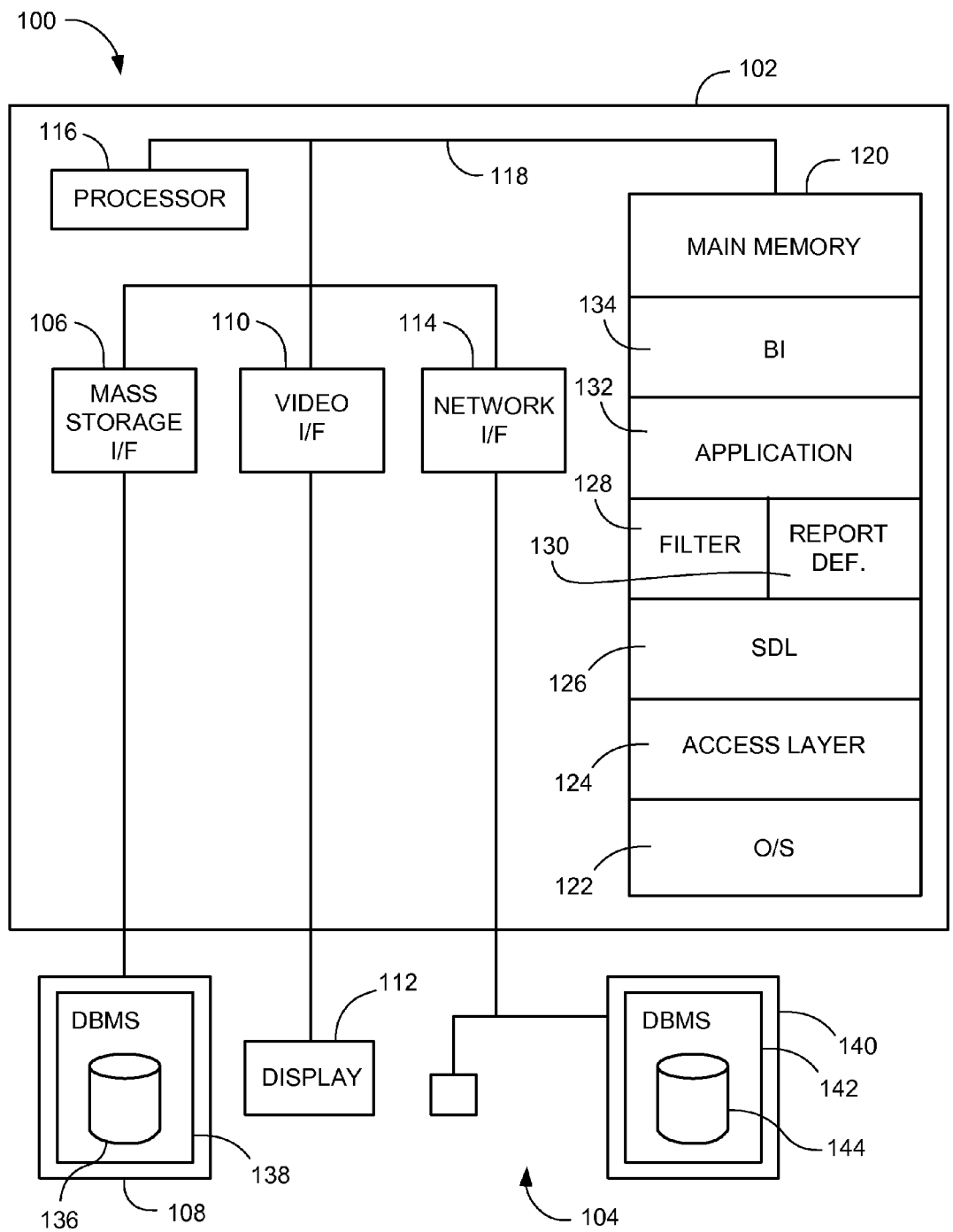
FIG. 1 presents an exemplary distributed computer system according to an embodiment of the present invention.

In the following description of the embodiments of the invention, reference is made to the accompanying drawings that form a part hereof, and in which are shown by way of illustration, exemplary embodiments in which the invention may be practiced. It is to be understood that other embodiments may be utilized and structural changes may be made without departing from the scope of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention; however, it will be apparent that the invention may be practiced without these specific details. In order to avoid obscuring the present invention, some well-known circuits, system configurations, and process steps are not disclosed in detail.

In addition, where multiple embodiments are disclosed and described having some features in common, for clarity and ease of illustration, description, and comprehension thereof, similar and like features one to another will ordinarily be described with like reference numerals. The embodiments have been numbered first embodiment, second embodiment, etc. as a matter of descriptive convenience and are not intended to have any other significance or provide limitations for the present invention.

For expository purposes, the term "metadata" as used herein is defined as data about data. The term "system" as used herein means and refers to the method and to the apparatus of the present invention in accordance with the context in which the term is used.

Embodiments of the invention provide techniques for applying a unique schema definition language and for utilizing the schema definition language in structuring, generating, and populating data bases or data stores; automatically generating Extract-Transform-Load functions; enabling Business Intelligence tools that reference the schema definition language to pull data from a database or data store. As used herein, Business Intelligence tools refer generally to software applications configured to report, analyze and present data. The data may be stored in a data warehouse, Database, Data store, data mart, or a combination thereof.

According to one aspect, the schema definition language can be implemented in or represented by a schema definition model that exhibits the relationship of traits, entities, and modules defined by the schema definition language. The schema definition language defines the structure and framework for physical tables of an operational data store. The schema definition language may include relationships and locations for mapping the schema definition model to one or more physical entities of physical data. Accordingly, the schema definition language defines and can be used to access a field of the physical data which contains the specific set of the physical data.

Advantageously, embodiments of the invention provide techniques for providing a schema definition language at a higher level of abstraction and providing a platform to interface with the schema definition language to enable Business Intelligence tools to utilize an operational data store with lower cost, and shorter time frame. The schema definition language enables the Business Intelligence tools to operate at a higher level of abstraction so the tools no longer have to be changed when underlying database evolves. Database evolution is easy and non-disruptive when utilizing the schema definition language of the present invention.

Advantageously, Business Intelligence tools utilizing the schema definition language to access and query the physical tables provide an intuitive experience to users by providing options that pertain to the types of traits selected in previous steps. The schema definition language can also be used to provide a simple structure to the physical tables enabling an easy and efficient solution to modeling and designing operational data stores. Further, utilizing the schema definition language allows the automation of extract, transform, and load functions to populate an operational data store quickly based on the schema definition language structure and metadata contained within a schema definition model.

In the following, reference is made to embodiments of the invention, and to specific examples; however, it should be understood that the invention is not limited to specific described embodiments or examples. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

When any of the appended claims are read to cover a purely software and/or firmware implementation, at least one of the elements in at least one example is hereby expressly defined to include a tangible computer-readable media storing the software and/or firmware.

One embodiment of the invention is implemented as a program product for use with a computer system. The program(s) of the program product defines functions of the embodiments (including the methods described herein) and can be contained on a variety of computer-readable storage media. Computer-readable storage media is defined herein as an article of manufacture. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention; however, it should be appreciated that any particular program nomenclature that follows is used merely for convenience, and thus the invention should not be limited to use solely in any specific application identified and/or implied by such nomenclature.

Referring now to FIG. 1, therein is shown an exemplary distributed computer system 100 according to an embodiment of the present invention. In general, the distributed computer system 100 is shown as a distributed environment and includes computer system 102 and a plurality of networked devices 104. The computer system 102 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention.

Illustratively, the computer system 102 comprises a networked system. However, the computer system 102 may also comprise a standalone device. In any case, it is understood that FIG. 1 is merely one configuration for the computer system 100. Embodiments of the invention can apply to any comparable configuration, regardless of whether the computer system 102 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer system 102 and/or one or more of the networked devices 104 may be thin clients which perform little or no processing.

The computer system 102 could include a number of operators and peripheral systems as shown, for example, by a mass storage interface 106 operably connected to a direct access storage device 108, by a video interface 110 operably connected to a display 112, and by a network interface 114 operably connected to the plurality of networked devices 104. The display 112 may be any video output device for outputting viewable information.

Computer system 102 is shown comprising at least one processor 116, which obtains instructions and data via a bus 118 from a main memory 120. The processor 116 could be any processor adapted to support the methods of the invention.

The main memory 120 is any memory sufficiently large to hold the necessary programs and data structures. Main memory 120 could be one or a combination of memory devices, including Random Access Memory, nonvolatile or backup memory, (e.g., programmable or flash memories, read-only memories, etc.). In addition, memory 120 may be considered to include memory physically located elsewhere in the computer system 102, for example, any storage capacity used as virtual memory or stored on a mass storage device (e.g., direct access storage device 108) or on another computer coupled to the computer system 102 via bus 118.

The memory 120 is shown configured with an operating system 122. The operating system 122 is the software used for managing the operation of the computer system 102.

The memory 120 further includes an access layer 124, a schema definition language 126, a filter 128, a report data definition 130, one or more applications 132, and a plurality of Business Intelligence tools 134. The applications 132, the Business Intelligence tools 134 and the access layer 124 are software products comprising a plurality of instructions that are resident at various times in various memory and storage devices in the computer system 102. When read and executed by one or more processors 116 in the computer system 102, the applications 132, the access layer 124 and the schema definition language 126, individually or in combination, cause the computer system 102 to perform steps necessary for executing various aspects of the invention.

The access layer 124 (and more generally, any requesting entity, including the operating system 122) are configured to issue queries against a database 136. Illustratively, the database 136 is shown as part of a database management system (DBMS) 138 in storage 108. Although only one database is shown for simplicity, the DBMS 138 may include multiple databases.

Further, the databases may be distributed relative to one another. Moreover, one or more databases can be distributed to one or more of the networked devices 104. Illustratively, a networked system 140 is shown having a DBMS 142 which includes a database 144. Although only a single database 144 is shown with the DBMS 142, for simplicity, the DBMS 142 may include multiple databases. Further, the databases of the DBMS 142 may be distributed relative to one another. All such different implementations are broadly contemplated. The storage 108 or the networked devices 104 may also include metadata tables, physical tables, the schema definition language 126, or a schema definition model, used by the application 132 to structure filters, provide user feedback, or structure report data definitions for the Business Intelligence tools 134.

The databases 136 and 144 are representative of any collection of data regardless of the particular physical representation of the data. A physical representation of data defines an organizational schema of the data.

In one embodiment, the database 136 includes an operational database and the database 144 includes an operational data store. The operational database includes at least a portion of the physical data contained in the data store. According to one aspect, the data store contains queryable data which is derived from physical data in the operational database. Accordingly, the queryable data in the data store includes a subset of the physical data in the operational database. In addition to the subset of data from the operational database, the data store may include other data.

Figure 4:
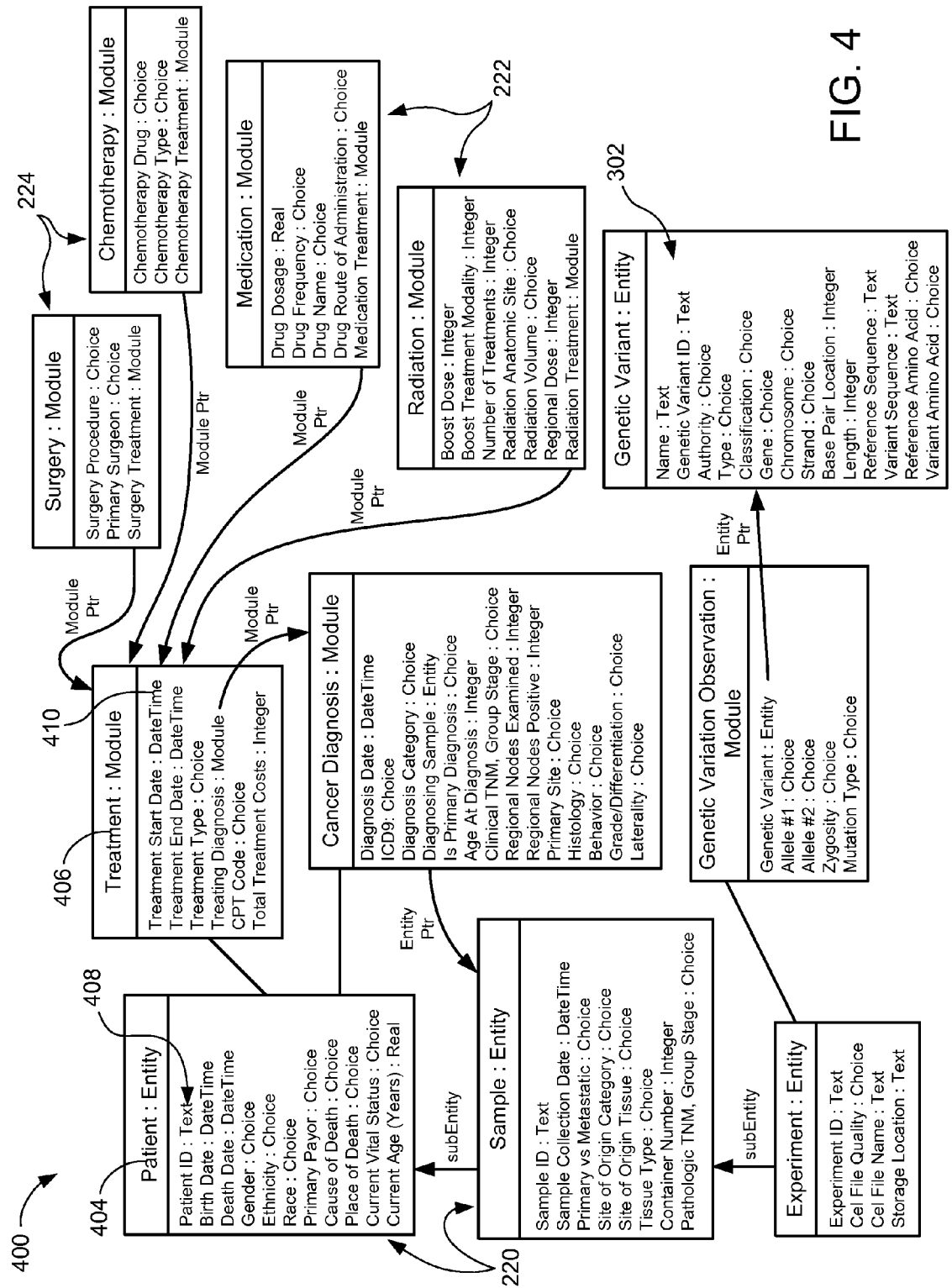
FIG. 4 presents an exemplary schema definition model according to an embodiment of the present invention.

In one embodiment, queries may be generated in response to input (e.g., user input). The queries can be composed using logical fields defined by the schema definition language 126. Queries are executed against the database 144 using the filter 128 which can reference the schema definition language 126 to isolate or define a class of entities 404 of FIG. 4 represented by physical data within the databases 144. Operation of the filter 128 is described in greater detail below with reference to FIGS. 9-12.

Queries are also executed against the database 144 using the report data definition 130 which can reference the schema definition language and structure reports of entities 404, modules 406, and trait observations 408 of FIG. 4, and pull data from physical tables within the database 144. Operation of the report data definition 130 is described in greater detail below with reference to FIGS. 13-15.

Figure 2:
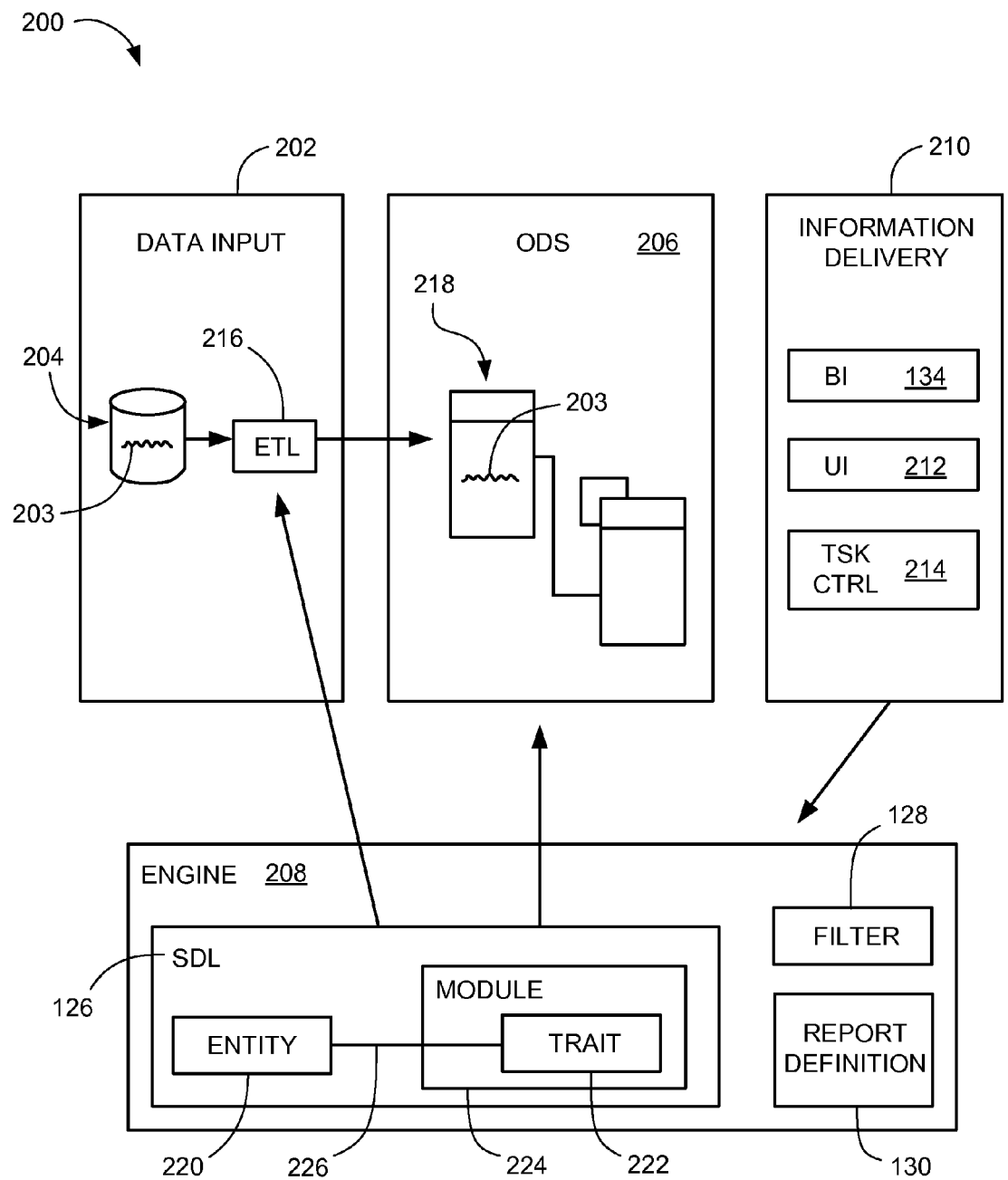
FIG. 2 presents an exemplary block diagram of a data handling system according to an embodiment of the present invention.

Referring now to FIG. 2, therein is shown an exemplary block diagram of a data handling system 200 according to an embodiment of the present invention. The data handling system 200 includes a data input block 202 for extracting data 203 from one or more external sources 204 and loading the data 203 that was extracted into an operational data store 206, coupled thereto. For instance, the external sources 204 can be the database 136 of the storage device 108 of FIG. 1. The operational data store 206 can be included within the database 144 of the networked devices 104 of FIG. 1.

The management engine 208 is configured to map and locate at least a portion of the data 203 in the operational data store 206, perform calculations of the location and relationship of the data 203 based on the schema definition language 126 for any subsequent allocation processing, mapping, filtering, or reporting.

The data handling system 200 also includes an information delivery block 210, coupled to the operational data store 206 and to the management engine 208, for delivering the data 203 to a user. The delivery function can be implemented by the Business Intelligence tools 134. The Business Intelligence tools 134 can be filtering tools for example the TransMed Systems Cohort Explorer or the TransMed Systems Clinical Pattern Matcher, described below in FIGS. 9 and 11, respectively. The Business Intelligence tools 134 can also be reporting tools such as the TransMed Systems Cohort Reporter or the TransMed Systems Cohort Analyzer, described below in FIGS. 13 and 15, respectively.

In addition, the information delivery block 210 of the data handling system 200 includes a user interface 212 for receiving runtime parameters from a user and a task controller 214 for launching the management engine 208 in response to the inputs from the user interface 212. The user interface 212 can include hardware and software for bidirectional communication with a user. The task controller 214 is also in communication with the management engine 208, which allows a user to submit parameters and instructions for grouping, filtering, and returning the data 203 via the user interface 212.

The data input block 202 uses an Extract-Transform-Load (ETL) tool 216 to extract the data 203 from one or more of the external sources 204 and then transform the data 203 extracted into at least one preferred data format. The data 203, which was transformed, can then be loaded into one or more physical tables 218 in the operational data store 206 for data storage.

Importantly, the management engine 208 can provide the schema definition language 126 as a framework for the Business Intelligence tools 134 and the physical tables 218. The management engine 208 can automatically generate the ETL tool 216 to populate the physical tables 218 with the data 203 from the external sources 204 utilizing the schema definition language 126.

The operation of automating the ETL tool 216 and populating the physical tables 218 is described below with regard to FIGS. 7 and 8. The management engine 208 can further provide the schema definition language 126 as a framework upon which the Business Intelligence tools 134 can operate to structure reports and filter searches.

The schema definition language 126 includes entity types 220, traits 222, and module types 224. The traits 222 are linked to the entity types 220 with a link 226. The traits 222 can be grouped together in the module types 224 based on whether the traits 222 are observed together.

The entity types 220, the traits 222, and the module types 224 can be metadata constructs of the schema definition language 126 that provide structure for the formation of the schema definition model 400 described below with regard to FIG. 4 that will provide the structure and relationship of the physical tables 218 in the operational data store 206. The schema definition language 126 further provides a framework for how the data 203 will populate the physical tables 218.

For illustrative purposes and ease of understanding, the entity types 220, traits 222, and the module types 224 will be described below with reference to the health care field. Those skilled in the art will recognize that such is for illustrative purposes only and is not intended to be limiting of the invention.

It is contemplated that the entity types 220 can define types of physical objects. The entity types 220 are abstractions and metadata 302, of FIG. 3, of actual entities 404 of FIG. 4, which are data constructs. The actual entities 404 are concrete instances of the entity types 220 having trait observations 408 of FIG. 4 and a lifetime. A lifetime as used herein is defined as a time-span within which the physical object exists in a state in which the reasonable observer would recognize the physical object as one of the entity types 220. Trait observations 408 are herein defined as observable facts about an entity 404.

In relation to the health care field the entity types 220 can be exemplified as a patient, physician, or facility. The entity 404 can be exemplified as a specific hospital, patient, physician, or payer. That is to say, the entity 404 can be Dr. Jones, or Suburban Hospital.

It is contemplated that the module types 224 can define specific records or moments that result in the observation of trait observations 408. The module types 224 are abstractions and metadata 302 of actual modules 406 of FIG. 4, which are data constructs. The actual modules 406 are concrete instances of the module types 224, the modules 406 can list trait observations 408 observed for an entity 404 that are normally observed together. As used herein module 406 is defined as a collection of related trait observations 408 for an entity 404 often observed together. The module types 224 can include start and end dates for the observation of the traits 222. The module types 224 lists the traits 222 associated with the module types 224 and identifies the module types 224 start and end date. It is further contemplated that the module types 224 can include only a single date or time stamp the same start and end time stamp for events without duration.

The module types 224 can be exemplified as an encounter (admission date, discharge date), a diagnosis (diagnosis date), treatment (treatment start and end date), and lab order (lab order date). The modules 406 themselves can be exemplified as a specific encounter, diagnosis, treatment, or lab order. That is to say, the module 406 can be Mike Johnson admitted to the Suburban hospital emergency room on Feb. 5, 2012, Mike Johnson diagnosed with pneumonia on Feb. 5, 2012, Dr. Jones administered Benzylpenicillin to Mike Johnson on Feb. 5, 2012 to treat Mike Johnson's pneumonia, or Dr. Jones orders a complete blood count without differential test for Mike Johnson on Feb. 5, 2012.

It is contemplated that the traits 222 can define a single observable property or trait observation 408 of or for an entity 404. The traits 222 have names and specify particular data types 410 of FIG. 4 such as Integer, Real, DateTime, Text, Choice, Module Pointer, or Entity Pointer. The traits 222 are abstractions and metadata 302 of observed trait observations 408, which are data constructs. The trait observations 408 are concrete instances of observations of facts about an entity 404. The trait observations 408 match the traits 222 data type 410.

The traits 222 can be exemplified for a diagnosis module type as a diagnosis date with a data type 410 of time, ICD9 selection with a data type 410 of choice, physician notes with a data type 410 of text, or severity selection with a data type 410 of choice. The traits 222 can further be exemplified for an encounter module type as admission date with a data type 410 of DateTime, discharge date with a data type 410 of DateTime, Primary payer with a data type 410 of choice, or discharge disposition with a data type 410 of choice.

The trait observation 408 can be exemplified for a diagnosis module as diagnosis date: "Feb. 5, 2012 at 1:30 PM", ICD9: "480.1", or physicians' notes: "patient has trouble breathing". The trait observation 408 can be exemplified for an encounter module as admission date: "Feb. 5, 2012 at 11:30 AM", discharge date: "Feb. 7, 2012 at 1:30 PM", primary payer: "Aetna", or discharge disposition: "home".

The traits 222 can include longitudinal and non-longitudinal trait observations 408. Longitudinal trait observations 408, as used herein, are defined to mean trait observations 408 corresponding to events treated as occurring within the lifespan of an entity 404. Usually longitudinal trait observations 408 have duration of less than the lifetime of the entity 404 that is observed to possess them. Non-longitudinal trait observations 408, as used herein, are defined to mean trait observations 408 that are treated as lasting for the lifespan of the entity 404 such as a name, a blood-type, or a patient ID. The non-longitudinal traits may change but they are not necessarily related to a specific event. The entity types 220 can be assigned a special one of the module types 224 to capture the non-longitudinal traits for an entity 404. Longitudinal traits, on the other hand, will be assigned a date of occurrence for the entity 404 and will be grouped with the standard module types 224.

Figure 3:
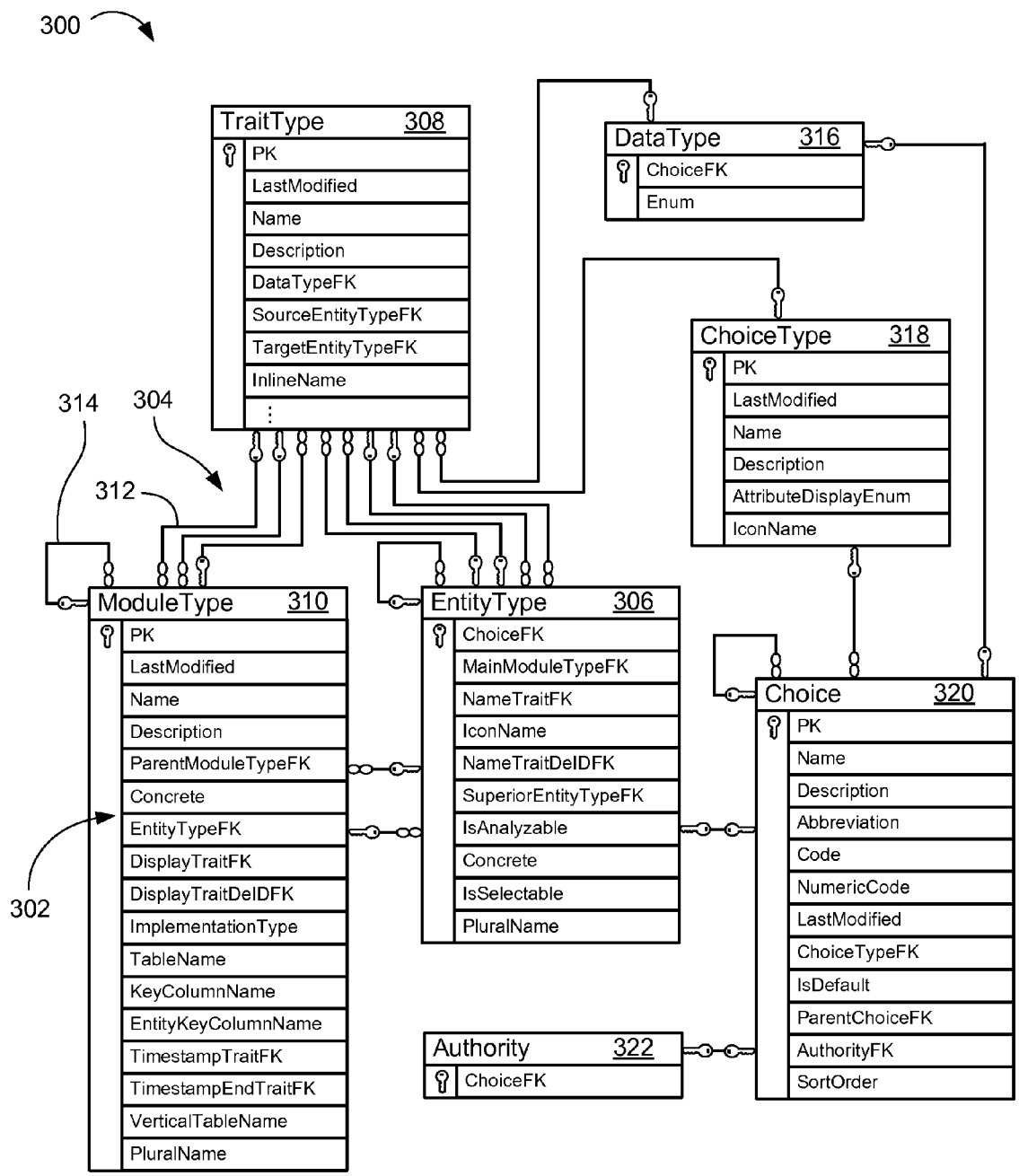
FIG. 3 presents exemplary metadata tables according to an embodiment of the present invention.

It has been discovered that utilizing the schema definition language 126 implemented as the metadata 302 and represented by the metadata tables 300 of FIG. 3 semantically represents the entities 404 linked to the trait observations that are grouped by the modules 406 and therefore provides a simple and effective framework for the physical tables 218. This framework, coupled with the schema definition language 126 of the metadata tables 300, enables quick, simple, and effective use of the physical data tables 218 by referencing the metadata tables 300. The physical data tables 218 can be filtered and used to generate reports by referencing the schema definition language 126 in the metadata tables 300.

The schema definition language 126 captured as metadata 302 in the metadata tables 300 allows the physical data tables 218 to be filtered and used to generate reports in an intuitive way while simultaneously decreasing implementation costs and timelines. Implementation timelines can be significantly reduced by utilizing the schema definition language 126 because in a typical data warehouse the data structure needs to be normalized and placed in dimensional tables; however, by utilizing the schema definition language 126, the data 203 can simply be associated with metadata constructs and data constructs. Once the association is provided the ETL tool 216 can be automatically generated and the physical tables 218 populated. As soon as the physical tables 218 of the operational data store 206 are populated, the Business Intelligence tools 134 can utilize the schema definition language 126 to filter, report, and query the data in the operational data store 206 rather than requiring multiple additional steps of normalization, and populating dimensional tables with an extract, transform, load action between each step.

It has further been discovered that the schema definition language 126 providing the traits 222 with a predefined data type 410 allows for automatic generation of the ETL tool 216 thus decreasing implementation costs and timelines significantly.

To enable the Business Intelligence tools 134 to operate effectively and provide the user with an intuitive experience, the information delivery block 210 is coupled to the management engine 208 to reference the schema definition language 126. The management engine 208 can further include the filter 128 and the report data definition 130. The filter 128 can be a one dimensional filter used to generate a class of the entities 404 based on the trait observations 408 of the entities 404. The filter is described in greater detail below with regard to FIGS. 9-12. The report data definition 130 can be a set of the entity types 220, the module types 224, and the traits 222 that are required or desired for a report and which will be utilized to retrieved the data 203 from the operational data store 206. The report data definition 130 is described in greater detail below with regard to FIGS. 13-14.

Referring now to FIG. 3, therein is shown exemplary metadata tables 300 according to an embodiment of the present invention. The metadata tables 300 represent the schema definition language 126 of FIG. 1. The schema definition language 126 can be used as the metadata 302 to describe the data 203 of the physical data tables 218 of FIG. 2. The metadata tables 300 can include a plurality of relational links 304 therebetween. The metadata tables 300 can include an entity type table 306 linked to a trait table 308. The entity type table 306 and the trait table 308 can be linked to a module type table 310.

The entity type table 306, the trait table 308, and the module type table 310 can correlate to the entity types 220, the traits 222, and the module types 224 of FIG. 2, respectively. The metadata tables 300 can include the entities 404, the modules 406 and the trait observations 408 of FIG. 4 as rows within the entity type table 306, the module type table 310, and the trait table 308, respectively.

The metadata tables 300 contain the metadata 302 that maps, by semantic representation, the physical data tables 218. As an example, the trait table 308 can contain rows that correspond to the trait observations 408. As an example, ICD9 choices are trait observations 408 that can be contained as rows within the trait table 308. The ICD9 choices of the trait table 308 can include pointers or references to the modules 406 and or the entities 404 that can be associated with the trait observations 408. For example, an ICD9 trait observation 408 might point to a diagnosis module 406 and to a patient entity 404.

Because the metadata tables 300 include a semantic representation or map of the structure of the physical data tables 218, the metadata tables 300 can be used to locate the data 203 contained within the physical data tables 218. The metadata tables 300 can also be used to determine the relational links 304 between the data 203 of the physical data tables 218.

The relationship of the module type table 306, the entity type table 306, and the trait table 308 show the relationship of the entity types 220, traits 222, and the module types 224 described in greater detail above with regard to FIG. 2.

The relational links 304 between the metadata tables 300 is a map for how the data 203 will eventually be structured within the physical tables 218 of the operational data store 206 of FIG. 2. The relational links 304 are a pictorial representation of the trait observations 408 pointing or referencing the modules 406, the entities 404, or other data or metadata constructs.

The relational links 304 of the schema definition language 126 provide the relational structure for the physical tables 218 that will eventually hold the data 203. The schema definition language 126 can provide a map for the location of the physical tables 218 and the relationship between the physical tables 218.

As an example, if a user selects a trait observation 408 to filter an entity 404 or module 406 by, the Business Intelligence tools 134 of FIG. 1 can reference the schema definition language 126 locate the trait observations 408 and determine how the trait observations 408 are linked to the entities 404 and the modules 406. Once the modules 406 and entities 404 linked to the trait observations 408 are determined by the metadata tables 300, other trait observations 408 that belong to the same modules 406 or entities 404 as the user selected trait observation 408.

By providing the relationship of the trait observations 408 to the entities 404 and modules 406 the management engine 208 of FIG. 2 can provide options to the user for selecting other trait observations 408 related to the first trait observation 408 selected or can provide options to the user for selecting other modules 406. The management engine 208 can utilize the schema definition language 126 to return other trait observations 408 to the user from the same module 406 as selections options for the user. In this way the schema definition language 126 can be utilized to provide relevant filter or report options to users based solely on the structure of the data 203 within the physical tables 218 as required and contained within the schema definition language 126.

The relational links 304 between the metadata tables 300 show many-to-one links 312. The entity type table 306 and the module type table 310 also include recursive links 314 allowing for hierarchical relationships between entities 404.

Other tables can make up the metadata tables 300 including a data type table 316, a choice type table 318, a choice table 320, and an authority table 322. It is contemplated that the metadata tables 300 can include more tables without departing from the invention. As an example, the metadata tables 300 may include a module type member table or a unit of measure table. It is further to be understood that tables can be combined or deleted without departing from the scope of the invention.

Referring now to FIG. 4, therein is shown an exemplary schema definition model 400 according to an embodiment of the present invention. The schema definition model 400 can be the application of the schema definition language 126 of FIG. 1 into a data context. Continuing with the health care example for illustrative purposes only, the entity types 220, module types 224, and the traits 222 have been mapped to metadata 302 for the entities 404, the modules 406, and the trait observations 408.

The metadata 302 can be associated with the entities 404, the modules 406, the trait observations 408, as well as the entity types 220, the module types 224, and the traits 222. As will be shown through illustrative example below, the metadata 302 contained within the schema definition model 400 can define how the trait observations 408 are linked to the entities 404 and how the trait observations 408 are grouped together in the modules 406.

As an illustrative example the entities 404 can be a patient, sample, experiment, or genetic variant. The entities 404 are shown having non-longitudinal trait observations 408 grouped therewith. As an illustrative example the trait observations 408 grouped with the entities 404 identified as patients can include an ID, birth date, death date, gender, ethnicity, primary payer, and current vital status.

The trait observations 408 grouped with the modules 406 are shown as longitudinal trait observations 408. As an illustrative example the traits grouped with the modules 406 having the metadata 302 for radiation can include boost dose, boost treatment modality, number of treatments, radiation anatomic site, radiation volume, and regional dose. The modules 406 can also include pointers which will be foreign keys to other modules 406 such as a pointer for treatment modules 406 in the modules 406 corresponding to radiation.

The modules 406 and the entities 404 are not depicted as the actual data 203 of FIG. 2 in the schema definition model 400 but instead are shown having the metadata 302. The trait observations 408 are also shown having the metadata 302 in the form of a data type 410. The data type 410 can specify the type of the data 203 that will eventually populate the physical tables 218 of FIG. 2.

The data type 410 for the trait observations 408 can specify integer data, real data, text data, long text data, dates, dates and times, choice data, module pointer data, and entity pointer data. Utilizing the data type 410 metadata 302 allows the ETL tool 216 of FIG. 2 to be automatically generated by the management engine 208 of FIG. 2. Generating the ETL tool 216 will be described in greater detail below with regard to FIG. 8.

Due to the recursive relationship of the entity type table 306 and the module type table 310 of FIG. 3 the entities 404 and the modules 406 can include sub-entities and sub-modules, respectively. The sub entities can be entities 404 that originate from a specific entity 404. The sub-modules can be modules 406 that originate from a specific module 406.

Figure 5:
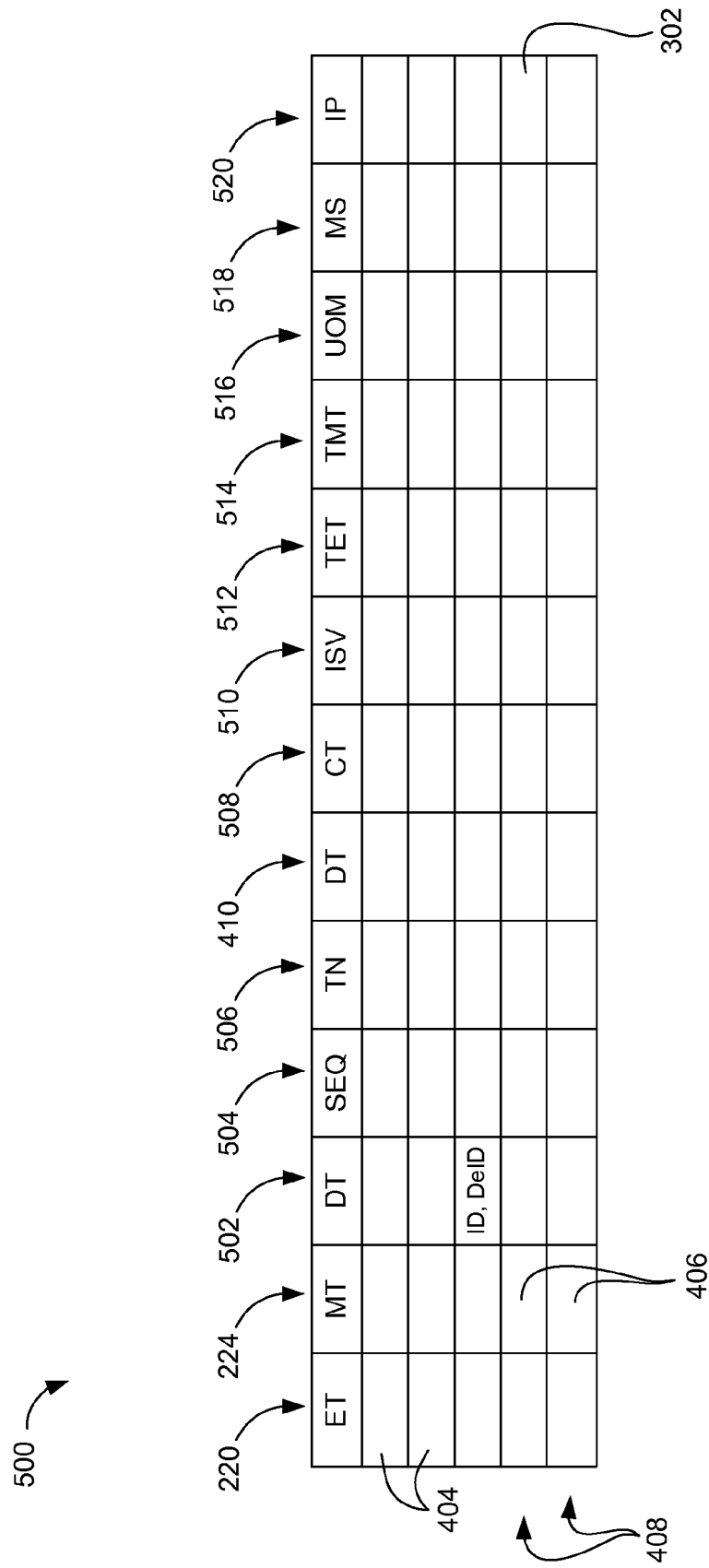
FIG. 5 presents an exemplary schema definition model table according to an embodiment of the present invention.

Referring now to FIG. 5, therein is shown an exemplary schema definition model table 500 according to an embodiment of the present invention. The schema definition model table 500 is shown in a simplified format for ease of description.

The schema definition model table 500 is shown having a plurality of columns and rows. Each row corresponds to the trait observations 408. The cells of the table are filled with metadata 302 rather than the actual data 203 that will populate the physical tables 218 of the operational data store 206 of FIG. 2.

In a similar manner to FIG. 4, the trait observations 408 can be linked to entity types 220 and module types 224. The entity types 220 can be represented by a first column while the module types 224 can be represented by a second column. In like manner, the rows of the trait observations 408 will pass through columns indicating other features of the trait observations 408. The trait observations 408 can be associated with a display trait 502, a sequence 504, a trait name 506, a data type 410, choice type 508, vertical indicator 510, target entity type 512, target module type 514, unit of measure 516, multiple selection indicator 518, and a protection indicator 520.

The entity types 220, of the first column, can be the entities 404 that the trait observations 408 are associated with. The entity types 220 can, for example, include patient, sample, experiment, genetic variant, hospital, or physician if the preceding health care field example is utilized. The module types 224, of the second column, can be the modules 406 that the trait observations 408 are associated with. The module types 224 can include patient information (which is a special module to contain non-longitudinal trait observations 408 for the entities 404), cancer diagnosis, chemotherapy, medication, radiation, surgery, treatment, labs and vitals, consent, sample information, experiment information, genetic variant observation, and others.

The display trait 502, of the third column, can indicate whether the trait observations 408 should be displayed as a default ID trait for a module 406. The display trait 502 can identify the trait observations 408 as either an identified trait or a de-identified trait. An example of an identified trait associated with a patient info module for a patient entity can be a patient ID. An example of an identified trait associated with a diagnosis module for a patient entity can be an ICD9 value. An example of a de-identified trait associated with a patient info module for a patient entity can be a birthday since this trait would be less helpful as a default value in working with the entities 404.

The sequence 504, of the fourth column, can indicate the order in which the trait observations 408 can be displayed within the modules 406. The trait name 506, of the fifth column, can identify the trait by name. As an example of the trait name 506 for a medication module, the trait observations 408 can be identified as drug dosage, drug frequency, drug name, drug route of administration, medication treatment, or medication diagnosis. Each of the module types 224 can include unique trait names 506 that will correspond to the data 203 mapped to the trait observations 408 in the physical tables 218.

The data type 410, of the sixth column, can indicate the type of data that the trait observations 408 will be stored in. The trait observations 408 can include integer data, real data, text data, long text data, date data, date time data, choice data, module pointers, or entity pointers.

The choice type 508, of the seventh column, will be used if the data type 410 corresponds to choice data. The choice type 508 can be a list of all valid choices for the trait observations 408 associated with choice data. As an example choice type 508 can include yes/no, or male/female. The choice type 508 can also include longer such as a list of potential types of chemotherapy for a treatment or chemotherapy module. This type of choice type 508 may be a list including Mechlorethamine, Cyclophosphamide, Chlorambucil, Melphalan, Ifosfamide, Thiotepa, Hexamethylmelamine, Altretamine, Procarbazine, Dacarbazine, Temozolomide, Carmustine, Lomustine, Streptozocin, Carboplatin, Cisplatin, or Oxaliplatin.

The vertical indicator 510, of column 8, can indicate how the trait observations 408 will be stored in the physical tables 218 of the operational data store 206. If the vertical indicator 510 is an 'N' indicating the trait observations 408 are not stored vertically, the trait observations 408 will be stored in a column in the table representing the module 406 the trait is associated with. If the vertical indicator 510 is a 'Y' indicating the trait observations 408 are stored vertically, the trait observations 408 will be stored in a separate table with each of the trait observations 408 having a separate row.

The target entity type 512, of the ninth column, will be used if the data type 410 is an entity pointer. The target entity type 512 can be used to indicate the entity types 220 referenced by the module 406 that the trait observations 408 are associated with. As an example one of the trait observations 408 corresponding to an entity pointer and associated with a cancer diagnosis module might reference the entity type 220 of 'sample' if the cancer diagnosis was arrived at with a biopsy.

The target module type 514, of the tenth column, will be used if the data type 410 is a module pointer. The target module type 514 can be used to indicate the module types 224 referenced by the module 406 that the trait observations 408 are associated with. As an example one of the trait observations 408 corresponding to a module pointer and associated with a radiation module might reference the module type 224 of 'treatment'.

The unit of measure 516, of the eleventh column, can be used to indicate the unit of measure for the trait observations 408 when they are numeric. As an example the unit of measure 516 can be pounds or kilograms.

The multiple selection indicator 518, of the twelfth column, can be utilized when the data type 410 is choice to indicate whether the user can choose multiple selections or only a single selection. As an example, if multiple selection indicator 518 is an 'N' then only one choice is valid, when the multiple selection indicator 518 is a 'Y' then multiple selections are valid.

The protection indicator 520, of the thirteenth column can indicate whether the trait contains sensitive information. For example if the protection indicator 520 is a 'Y' the trait may contain patient identifying information and should be treated differently.

The schema definition model table 500 will be used to generate the physical tables 218 of the operational data store 206. Each of the modules 406 will be a separate table within the operational data store 206. Each of the trait observations 408 will be columns within the tables of the modules 406 to which they are associated. The data 203 will occupy the cells within the physical tables 218.

Figure 6:
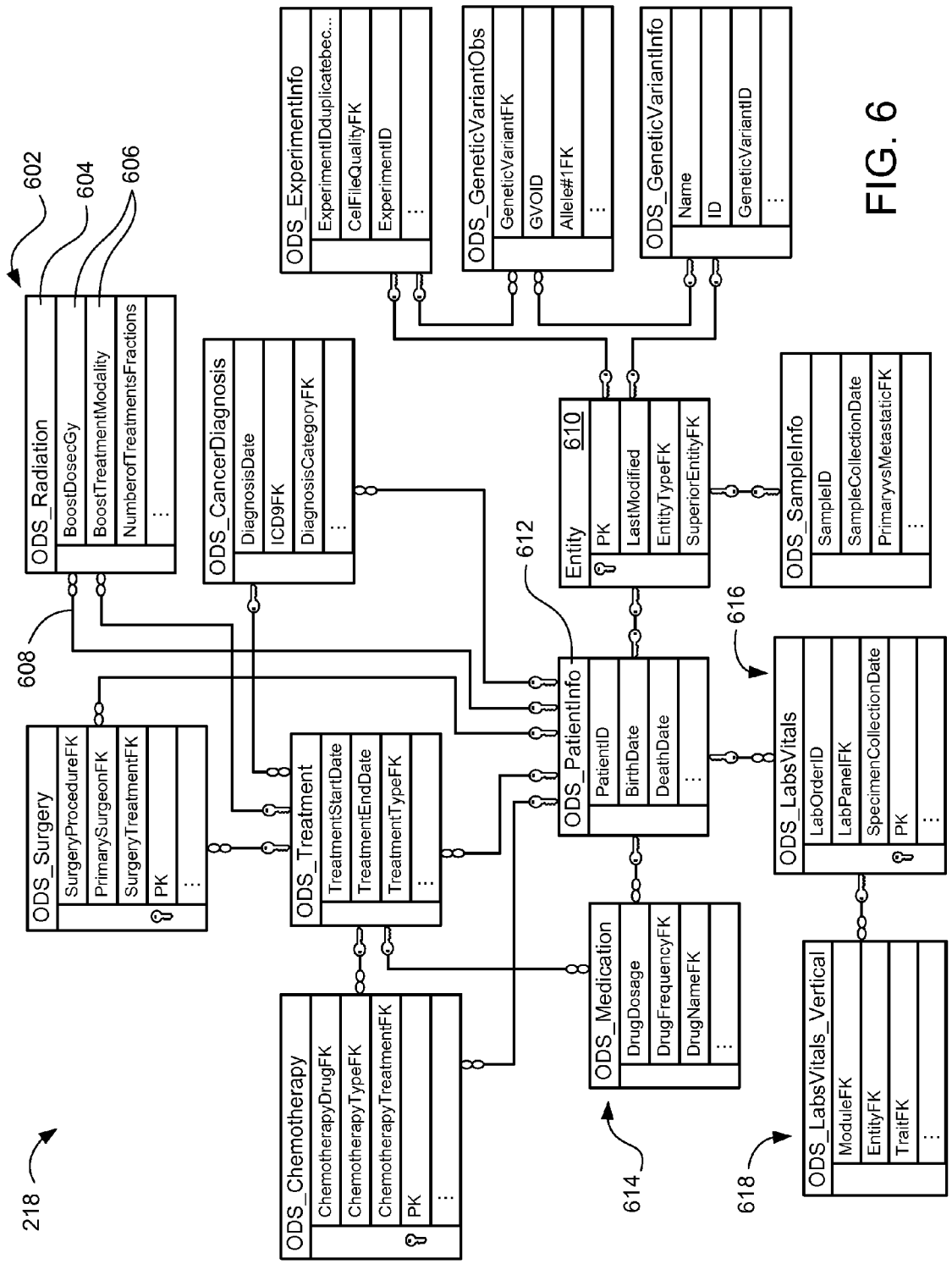
FIG. 6 presents exemplary physical schema tables according to an embodiment of the present invention.

Referring now to FIG. 6, therein is shown exemplary physical tables 218 according to an embodiment of the present invention. The physical tables 218 can be the physical tables 218 of the operational data store 206 of FIG. 2.

As described below, the physical tables 218 can be generated by referencing the metadata 302 of FIG. 3 contained within the schema definition language 126 of FIG. 1 alone or in combination with the schema definition language 126 represented in the metadata tables 300 of FIG. 3, the schema definition model 400 of FIG. 4, the schema definition model table 500 of FIG. 5 or a combination thereof. The physical tables 218 can include tables for the modules 406 and the entities 404 of FIG. 4 having links therebetween based on at least one of the trait observations 408 of FIG. 4.

Continuing with the healthcare example previously discussed and utilizing the schema definition language 126, the physical tables 218 are shown correlating to the modules 406 defined in the module types 224 column or, the second column of the schema definition model table 500. Each of the modules 406 defined in the schema definition model table 500 have a unique physical table 602 created in the full list of the physical tables 218.

The physical tables 218 can include a table title 604 and then a list of column names 606. The column names 606 are the trait observations 408 contained in the rows of the schema definition model table 500. Furthermore, when the trait observations 408 of the schema definition model table 500 are module pointers or entity pointers, these trait observations 408 are depicted in the physical tables 218 as links 608. In general the links 608 can include one-to-one relationships or many-to-one relationships.

For example an entity table 610 can have a one-to-one relationship with an ODS_PatientInfo table 612. This means that for every entity the entity table 610 will include one foreign key pointing to the ODS_PatientInfo table 612. Likewise, the ODS_PatientInfo table 612 will include one foreign key pointing to the entity table 610.

The physical tables 218 can further include many to one links. For example the ODS_PatientInfo table 612 can include many foreign keys from multiple ODS_Medication tables 614, but each ODS_Medication table 614 will include only a single foreign key for the ODS_PatientInfo table 612.

Another solution presented by the use of the schema definition language 126 is provided by the vertical indicator 510 flag. Typically when the vertical indicator 510 flag is a negative or 'N', each trait observations 408 in the schema definition model table 500 will be a column in the physical data tables 218. This is illustrated by the ODS_LabsVitals table 616. However, when the trait observations 408 become very numerous the vertical indicator 510 can be set to a positive or a 'Y'. When the vertical indicator 510 is positive it indicates that the trait observations 408 should not be structured as columns within the physical data tables 218 but should occupy rows within a separate table illustrated as the ODS_LabsVitals_Vertical table 618. As an example trait observations 408 such as white blood cell count and red blood cell count would occupy the ODS_LabsVitals_Vertical table 618 along with other numerous traits.

The data requirements described with regard to FIG. 1 through FIG. 6 as well as the data requirements for the flow charts of FIG. 7, FIG. 8, FIG. 9, FIG. 11, FIG. 13, and FIG. 15 can be fixed on or saved within non-transitory computer-readable media. These data requirements cannot be accessed or modified without the use and implementation of hardware and changes in data values can represent physical, non-transitory transformations of hardware records in the form of bits.

Having described the data requirements for the implementation and use of the operational data store 206 of FIG. 2, we now describe the process for implementation and use of the operational data store 206. The process steps for implementing and using the operational data store 206, in the flow charts described with regard to FIG. 7, FIG. 8, FIG. 9, FIG. 11, FIG. 13, and FIG. 15, can be implemented in hardware, software, firmware, or any combination thereof. Furthermore, the step boundaries commonly vary and functions are implemented together, as well as separately in different embodiments.

Figure 7:
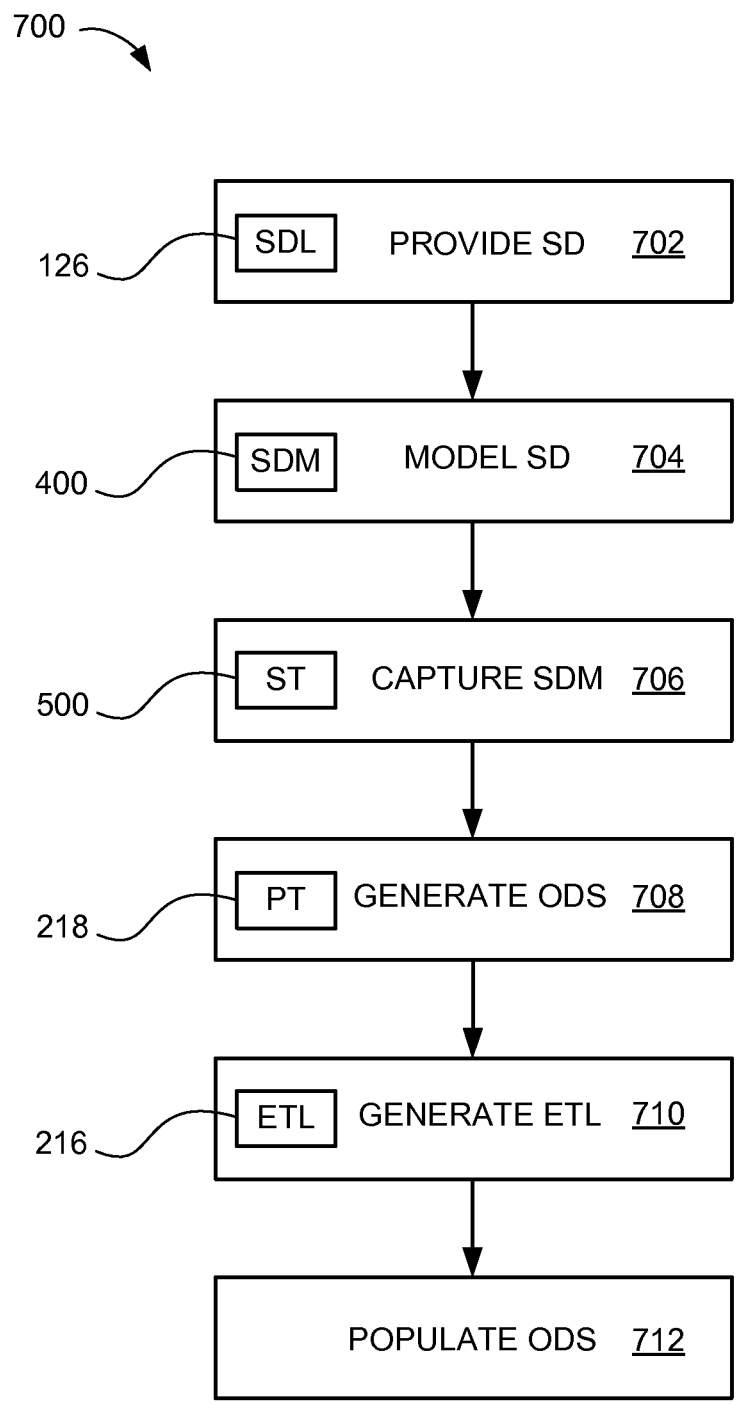
FIG. 7 presents an exemplary control flow for implementing and populating an operational data store according to an embodiment of the invention.

Referring now to FIG. 7, therein is shown an exemplary control flow 700 for implementing and populating an operational data store according to an embodiment of the invention. As an example the operational data store 206 of FIG. 2 might be implemented and populated in a similar manner.

The control flow 700 includes a provide schema definition language step 702. The provide schema definition language step 702 can be invoked to provide the schema definition language 126. By providing the schema definition language 126 a designer can utilize the data and metadata constructs.

Coupled to the provide schema definition language step 702 is a model schema definition step 704. During the model schema definition step 704 designers will utilize the schema definition language 126 to define the schema definition model 400 using data elements contained in existing files, existing operational data stores, or existing databases. The schema definition language 126 is actually implemented by the designers by utilizing the metadata and data constructs described in greater detail above with regard to FIG. 2 and FIG. 3.

The model schema definition step 704 can be coupled to a capture schema definition model step 706. During the capture schema definition model step 706 the schema definition model 400 can be captured within the schema definition model table 500 providing a row for each of the trait observations 408 and assigning or correlating them to the entities 404 and modules 406 of FIG. 4. It is contemplated that the capture schema definition model step 706 may be skipped and that the schema definition language 126 can be used in place of the schema definition model table 500 for referencing and querying the metadata 302. The schema definition language 126 can be used as the metadata tables 300 of FIG. 3, the schema definition model 400, or a combination thereof.

The capture schema definition model step 706 can be coupled to a generate operational data store (ODS) step 708. The generate ODS step 708 includes generating the physical tables 218 of the operational data store 206 from the schema definition language 126 contained within the schema definition model table 500 and creating the links 608 of FIG. 6 therebetween.

Specifically, during the generate ODS step 708 one of the physical tables 218 is first generated for each of the modules 406. If the vertical indicator 510 of the schema definition model table 500 is an 'N' then a column is created in the physical table 602 of FIG. 6 for the module 406 associated with the trait observations 408. When the column is created for the trait observations 408, the data type 410 indicator of FIG. 5 determines the type of data the column will include.

During the generate ODS step 708 a foreign key will be generated for the trait observations 408 that are of the data type 410 choice for reference to a choice table. Likewise, during the generate ODS step 708 a foreign key will be generated for the trait observations 408 that include an indicator in target entity type 512 or target module type 514 of the schema definition model table 500. If the target entity type 512 includes an indicator a foreign key referencing an entity table 610 of FIG. 6 will be generated. On the other hand, if the target module type 514 includes an indicator a foreign key referencing a one of the module tables will be created.

If the vertical indicator 510 of the schema definition model table 500 is a 'Y' then a column will not be generated for the trait observations 408. Instead, this type of trait observation 408 will be loaded into the modules 406 associated vertical table, one trait observation 408 per row. Finally, trait observations 408 corresponding to longitudinal timestamps will be associated with the physical tables 218 of the modules 406.

The generate ODS step 708 is coupled to a generate ETL step 710. Once the physical tables 218 of the generate ODS step 708 are completed along with the schema definition model table 500 completed in the capture schema definition model step 706, the ETL tool 216 can be automatically generated based on the schema definition model table 500 and the schema definition language 126. The generation of the ETL tool 216 will be described in greater detail below with regard to FIG. 8.

The generate ETL step 710 is coupled to a populate ODS step 712. Once the ETL tool 216 is generated automatically from the schema definition model table 500 and the schema definition language 126, and once the physical tables 218 are created, the ETL tool 216 is utilized in the populate ODS step 712 to extract the data 203 from the external sources 204 of FIG. 2, transform the data 203 of FIG. 2 into a format that is compliant with the data type 410, choice type 508, or other columns of the schema definition model table 500. Once the data 203 is compliant with the requirements of the schema definition model table 500 and the schema definition language 126, the data 203 is loaded into the physical tables 218 of the operational data store 206.

It is understood that when reference or use of elements including the schema definition language 126, the schema definition model 400, or the schema definition model table 500 in the flow charts of FIG. 8, FIG. 9, FIG. 11, FIG. 13, and FIG. 15 that it is contemplated that either one or some combination thereof can be referenced or used in place of or along with the named element. For ease of description, the schema definition model table 500 is generally used as an example of reference for the flow charts.

Figure 8:
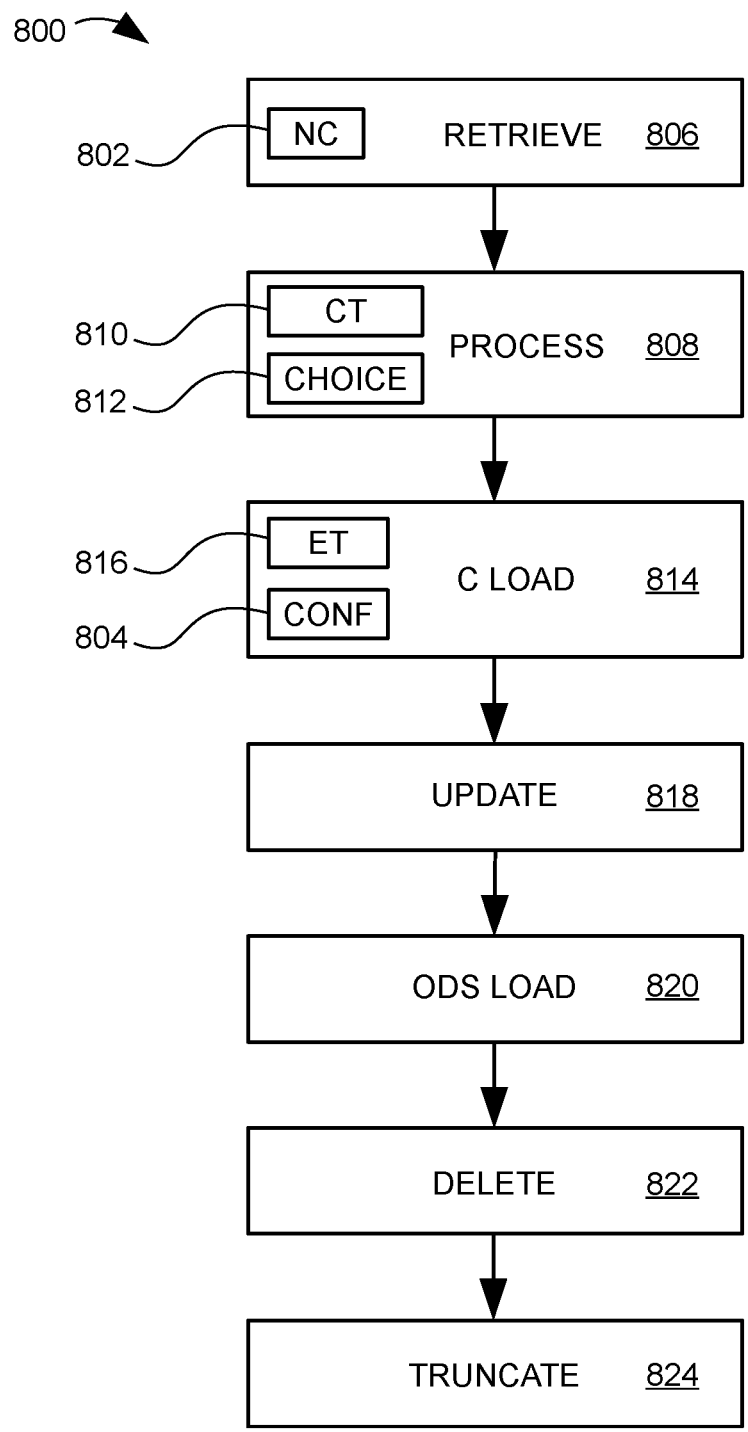
FIG. 8 presents an exemplary control flow for generating an extract transform load function according to an embodiment of the invention.

Referring now to FIG. 8, therein is shown an exemplary control flow 800 for generating an extract transform load function according to an embodiment of the invention. The control flow 800 illustrates an exemplary method of automatically generating the ETL tool 216 of FIG. 2 by referencing the schema definition language 126 of FIG. 1. The schema definition language 126 can be referenced in regard to the metadata 302 contained within the metadata tables 300 of FIG. 3, the schema definition model 400 of FIG. 4, the schema definition model table 500 of FIG. 5, or a combination thereof. As will be described below, the physical tables 218 of FIG. 2 can be populated with the data 203 of FIG. 2 by automatically generating the ETL tool 216 in accordance with the metadata 302.

Generally, the data 203 from the external sources 204 of FIG. 2 flows through non-conformed staging tables 802 and conformed staging tables 804 before ultimately landing in the operational data store 206 of FIG. 2. The management engine 208 of FIG. 2 can automatically generate the non-conformed staging tables 802 and the conformed staging tables 804 from the schema definition language 126.

The data 203 that is unclean source data must first be parsed and scrubbed in the non-conformed staging tables 802 before moving into the conformed staging tables 804. Adapters and APIs can be provided to parse the data 203 and kick out records that fail syntax verifications. The data 203 that is clean can flow directly into the conformed staging tables 804. Table and database level verifications can be performed in the conformed staging tables 804.

The ETL tool 216 routines, which move the data from the non-conformed staging tables 802 and the conformed staging tables 804 into the operational data store 206, can be automatically generated. This process is described in greater detail with regard to steps 806-824, below.

Initially, a retrieve step 806 can retrieve the data 203 as non-confirming source data. This can be in the form of a flat file; however, it is contemplated that the data can be in any useable form. As a flat file, the data 203 can be of a text string type of data 203. The source data can include data 203 corresponding to the entities 404 and to modules 406 of FIG. 4. As an example a source data in the non-conformed staging tables 802 can include a patient info flat file, which can correspond to a special module type holding non-longitudinal data for the entities 404 and entity types 220 of FIG. 2.

The non-conformed staging tables 802 can further include module tables corresponding to the modules 406 and module types 224 of FIG. 2. As an exemplary example the non-conformed staging tables 802 can include a cancer diagnosis flat file which corresponds to diagnosis module types 224 and a cancer diagnosis module 406.

The data 203 in the non-conformed staging tables 802 corresponding to the modules 406 can include a foreign key pointing to the entities 404 with which they are associated. On the other hand, the data 203 in the non-conformed staging tables 802 corresponding to the entities 404 can include a primary key (such as patient ID) as a primary key for the entities 404 as well as the modules 406 specially created only to hold the non-longitudinal data for the entities 404.

Coupled to the retrieve step 806 is a process step 808. The process step 808 can collect and or organize the metadata 302 of the schema definition language 126 into choice type conformed stage tables 810 and choice conformed stage tables 812. Each observed choice available from the schema definition language 126 can be placed in the choice type conformed stage tables 810 and can be assigned a primary key, and a choice type ID such as gender, ethnicity, ICD9, etc.

The choice conformed stage tables 812 can include a foreign key of the choice type conformed stage tables 810 and a primary key for each choice available. The choices might include male, female, Caucasian, Hispanic, Asian, 173.0-malignant . . . , 174.4-Paget's . . . , or 174.6-Neoplasm. A last date modified can also be included in the choice type conformed stage tables 810 and the choice conformed stage tables 812. When performing an incremental load, the choices available can be from the operational data store 206.

Coupled to the process step 808 is a conformed load step 814. The conformed load step 814 can include the conformed staging tables 804. Definitions contained within the metadata 302 of the schema definition language 126 for the modules 406 and the trait observations 408 of FIG. 4 stored within the metadata tables 300, the schema definition model table 500, or the schema definition model 400 can be used to determine how the data should be loaded into the conformed staging tables 804. For example the metadata 302 may require the data type 410 of FIG. 4 to be a Date. In that case the data 203 extracted from the non-conformed staging tables 802 should be in the Date format when it is loaded into the conformed staging tables 804.

The entities 404 contained within the non-conformed staging tables 802 can be loaded into the conformed staging tables 804. Each row of the conformed staging tables 804 can include a single instance of the entities 404. Each of the entities 404 is assigned a conformed staging table primary key. The entities 404, which are sub-entities of the entities, will be loaded and given a pointer to the parent entity. For example patient may have had a sample taken therefrom. The sample will be considered a sub-entity and have a pointer back to the patient. The pointer can be the conformed staging table primary key of the patient. The entities 404 themselves and not the non-longitudinal data 203, is first loaded into the conformed staging tables 804.

Once the entities 404 are loaded into the conformed staging tables 804, the data 203 associated with the modules 406 can be loaded into the conformed staging tables 804. In the conformed load step 814, the non-conformed staging tables 802 is opened and parsed.

As each row of the non-conformed staging tables 802 is processed, the conformed load step 814 converts the value of the data 203 to the target data type 410, ensures non null trait observations 408 have a trait value, and verifies valid constraints for the trait observations 408. When the constraints for the trait observations 408 is verified, value range constraints for dates and numeric trait observations 408 are verified, valid characters and valid lengths for text trait observations 408 are verified, and valid references to the entities 404 is verified. Verifying the validity of references to other modules 406 is performed during a second pass.

Any error during the conformed load step 814 causes the record associated with one of the modules 406 to be placed in an error table 816. Each row that is successfully processed will be assigned a unique conformed staging table primary key. The conformed staging tables 804 can include a first row indicating the primary and foreign keys, a second row indicating the data type 410 of the column, and the third row can indicate the column names for the conformed staging tables 804. The conformed staging tables 804 mirror the operational data store 206 schema with the exception that the trait observations 408 referencing other modules 406.

The continuing with the flat file example described above, the flat file text values can be converted into the proper data type 410. And references to the entities 404 are replaced with the conformed staging table primary key.

When a record fails the validity checks of the conformed load step 814, the record can be placed into the error table 816. For example if a record containing the non-longitudinal data 203 for the entities 404 includes an improper birth date the record can be placed in the error table 816. Further, when the data corresponding to a module referencing the entities 404 in the error table 816, the modules 406 record is also placed within the error table 816.

Once the modules 406 are loaded into the conformed staging tables 804 in the conformed load step 814, the references between the modules 406 can be updated in an update step 818. The update step 818, coupled to the conformed load step 814, ensures proper dependencies for the modules 406 by including the references only after all the modules 406 are loaded into the conformed staging tables 804.

The update step 818 can create two extra columns for each of the trait observations 408 that reference another module 406 within the staging tables 804. The two extra columns can include the referenced module name as well as the referenced module foreign key. As an example, treatments refer to the diagnosis, the treatment trait observations 408 will include the additional columns treating diagnosis and treating diagnosis foreign key.

The columns including the referenced module foreign key can include the conformed staging table primary key of the referenced module 406. At this point, any of the trait observations 408 referencing invalid, missing, or modules 406 in the error table 816 are deleted and placed within the error table 816. The update step 818 can include adapters so that installations can insert their own, custom validation at this point in the process.

Couple to the update step 818 is an operational data store load step 820. After the update step 818 the conformed staging tables 804 includes validated data. The operational data store load step 820 generates a SQL Server Merge statement for each of the conformed staging tables 804. The operational data store load step 820 can generate the SQL Server Merge statement for the choice type conformed stage tables 810, then the choice conformed stage tables 812, then the conformed staging tables 804 including the entities 404, then the conformed staging tables 804 including the entities 404 non-longitudinal data 203, and finally the conformed staging tables 804 for the other modules 406.

Since the data 203 within the conformed staging tables 804 is all verified, only environmental problems can cause the merge to fail. The environmental problems can include problems such as not enough disk space. If a merge does fail, the operational data store load step 820 logs the error and stops.

Coupled to the operational data store load step 820 is a delete step 822. The delete step 822 applies during incremental loads into the operational data store 206. During incremental loads, a delete flag is loaded into conformed staging tables 804 and the ODS. The delete step 822 validates that the record to be deleted does exist in the operational data store 206. If the record to be deleted does not exist in the operational data store 206, the record is routed to the error table 816. Once the load is complete, the delete step 822 deletes the records having the delete flag with cascading to ensure referential integrity.

Coupled to the delete step 822 as a truncate step 824. The truncate step 824 can truncate all the conformed staging tables 804 to prepare for a subsequent incremental load if the load was successful. Once the data 203 has been loaded into the operational data store 206, users can fully utilize and access the data 203 using the Business Intelligence tools 134 of FIG. 1 described in greater detail below with regard to FIGS. 9-15.

Figure 9:
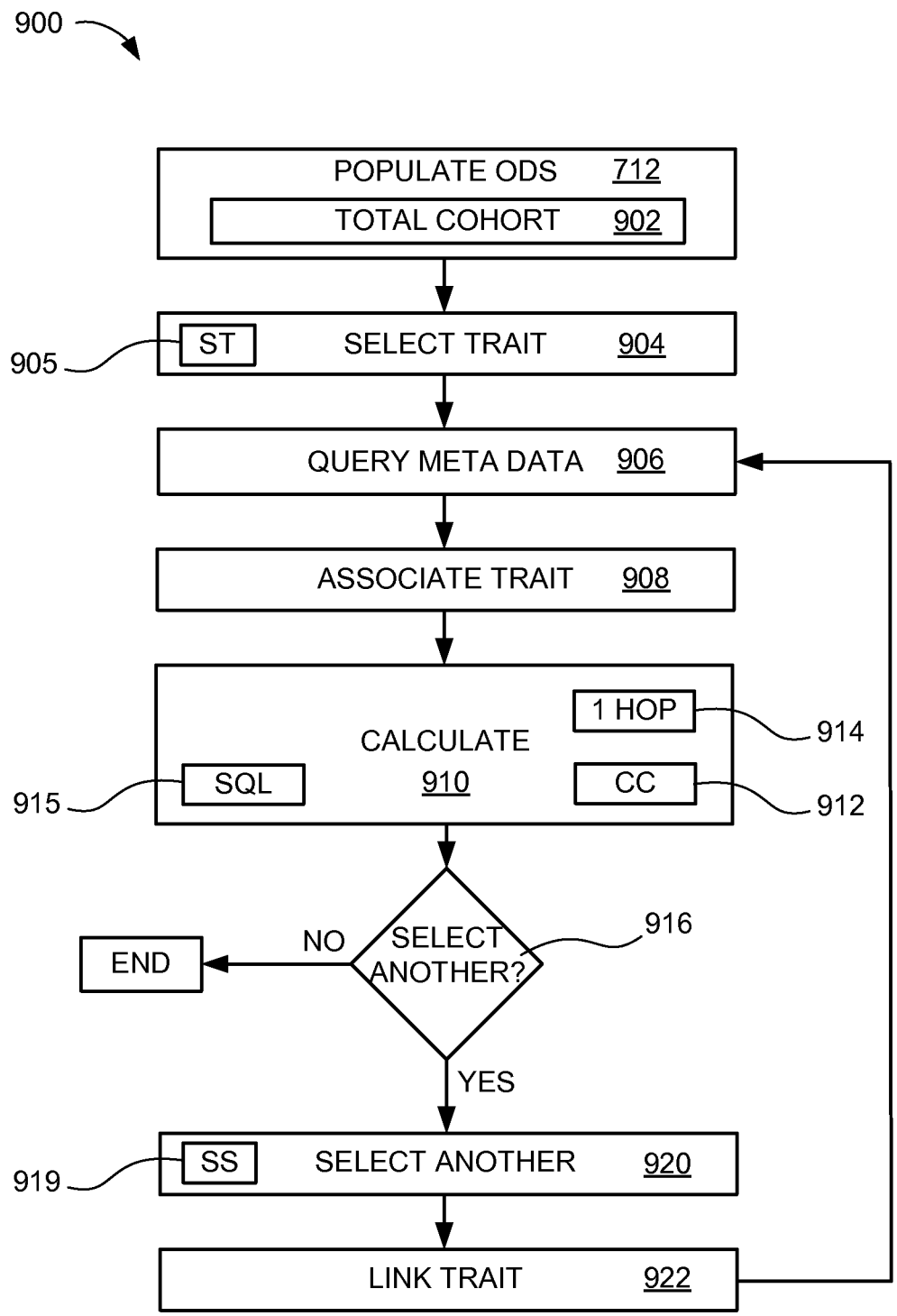
FIG. 9 presents an exemplary control flow for filtering a cohort according to an embodiment of the invention.

Referring now to FIG. 9, therein is shown an exemplary control flow 900 for filtering a cohort according to an embodiment of the invention. The exemplary control flow 900 can be an exemplary illustration of how the filter 128 of FIG. 1 operates against the schema definition language 126 of FIG. 1. The metadata 302 of the schema definition language 126 can be referenced from the metadata tables 300 of FIG. 3, the schema definition model table 500 of FIG. 5, the schema definition model 400 of FIG. 4, or a combination thereof.

As soon as the operational data store 206 of FIG. 2 is populated, in the populate ODS step 712, the Business Intelligence tools 134 of FIG. 1 are fully functional because they operate against the schema definition language 126. When the operational data store 206 is populated a total cohort 902 will be available. The total cohort 902 can include all of the entities 404 of FIG. 4 represented within the operational data store 206.

The total cohort 902 can be the starting point for filtering the operational data store 206. The entities 404 of the total cohort 902 can be filtered using any of the trait observations 408 of FIG. 4 within schema definition language 126. The trait observations 408 within the schema definition language 126 can be identified by the metadata 302 of FIG. 3 associated with the trait observations 408.

In a select trait step 904, which is coupled to the populate ODS step 712, a user can select a selected trait 905. The selected trait 905 can be one of the trait observations 408. As an extension of the healthcare examples utilized above, a user may want to determine a patient class of the entities 404 with an ICD9 diagnosis for breast cancer.

The Business Intelligence tools 134 return, from the schema definition language 126, all trait observations 408 such as valid ICD9 choices. The User could select one of the trait observations 408 as the selected trait 905 and further filter the selected trait 905, such as selecting the ICD9 traits and filtering them for only the ICD9 codes that correspond to breast cancer.

After the user selects the selected trait 905 with which to filter the total cohort 902, the Business Intelligence tools 134 can query the schema definition language 126 for the modules 406 of FIG. 4 and entities 404 associated with the selected trait 905 in a query metadata step 906. The schema definition language 126 query can return the metadata 302 about the modules 406, entities 404, and other trait observations 408 related to the selected trait 905. Further, the modules 406 and entities 404 associated with the selected trait 905 can be identified within the physical data tables 218 of FIG. 2. The Business Intelligence tools 134 can further return the entity types 220 and module types 224 of FIG. 2 associated with the selected trait 905.

After the schema definition language 126 is queried an associate trait step 908, coupled to the query metadata step 906, can return the modules 406 and the entities 404 from the schema definition language 126 that are associated with the selected trait 905. If the selected trait 905 is only associated with the entities 404, no modules 406 are associated with the selected trait 905 and only the entities 404 are returned.

With the return of the entities 404 and modules 406 associated with the selected trait 905, a calculate step 910, coupled to the associate trait step 908, can calculate a current cohort 912 and all one-hop linkages 914. When the calculate step 910 calculates the current cohort 912, the schema definition language 126 can be used to locate the physical tables 218 of the operational data store 206 that correspond to patients having the selected trait 905.

A query can be generated based on the metadata 302 of the schema definition language 126 to extract the data 203 of FIG. 2 of the entities 404 associated with the selected trait 905. The calculate step 910 can automatically generate SQL instructions 915 to query the physical tables 218 and return the current cohort 912 associated with the selected trait 905 by locating the links 608 and physical tables 602 of FIG. 6 of the trait observations 408, modules 406, and entities 404. The schema definition language 126 can be referenced as the metadata tables 300 which can be used to find the columns for each of the physical data tables 218 where the data 203 is physically located.

The Business Intelligence tools 134 can return the current cohort 912 as a number of the entities 404 that are associated with the selected trait 905. The calculate step 910 can also calculate the one-hop linkages 914 and present them as selection options to the user to further refine the filter 128.

The one-hop linkages 914 can be the other unselected trait observations 408 that correspond to the entities 404 and modules 406 that the selected trait 905 correspond to. That is, the one-hop linkages 914 are unselected traits from the same modules 406 and entities 404 that the selected trait observations 408 are associated with. Along with calculating unselected traits, the calculate step 910 can also return the modules 406 and entities 404 as one-hop linkages 914. When the modules 406 and entities 404 associated with the selected trait 905 are pointed to by other unassociated modules 406 or entities 404, these unassociated modules 406 or entities 404 can be returned as one-hop linkages 914. That is to say, when the target entity type 512 of FIG. 5 or the target module type 514 of FIG. 5 for any trait observations 408 include a data pointer to the modules 406 or entities 404 associated with the selected trait 905, the modules 406 and entities 404 associated with the trait observations 408 having the data pointer will be returned as one-hop linkages 914.

To illustrate the calculation of the one-hop linkages 914 utilizing the example of filtering based on breast cancer, the calculate step 910 can calculate the one-hop linkages 914 for the entities 404 associated with the selected trait 905 such as age, gender, weight, and other non-longitudinal trait observations 408 corresponding to the entities 404. The calculate step 910 can further calculate the one-hop linkages 914 for the modules 406 associated with the selected trait 905 such as date of diagnosis, age at diagnosis, primary site, or other longitudinal trait observations 408 corresponding to the modules 406.

The calculate step 910 can also return the one-hop linkages 914 of other modules 406 or entities 404 unassociated with the selected trait 905. For example, if the trait observation 408 selected by the user included an ICD9 for breast cancer, the ICD9 trait corresponds to a diagnosis module and the calculate step 910 can then return an option to the user to filter with a treatment because the treatment module includes a pointer in the target module type 514 to the diagnosis module.

Coupled to the calculate step 910 is a select another trait option 916. If the user decides not to select more trait observations 408, the select another trait option 916 will terminate the operation of the filter 128 in an end step 918. When the end step 918 is invoked the current cohort 912 can still be utilized or saved for further use with the Business Intelligence tools 134.

If the user decides in the select another trait option 916 to select another trait, a subsequent selected trait 919 can be selected in a select another trait step 920 coupled to the select another trait option 916. The user can select the subsequent selected trait 919 in a similar manner to the way the user selected the selected trait 905 in the select trait step 904.

One difference between the user's experience in the select another trait step 920 opposed to the select trait step 904 is that in the select another trait step 920 the user is given the one-hop linkages 914 as selection options and the current cohort 912 is displayed rather than the total cohort 902.

Once the user selects the subsequent selected trait 919, the subsequent selected trait 919 can be linked to the selected trait 905 in a link trait step 922, coupled to the select another trait step 920. The link trait step 922 can link the selected trait 905 to the subsequent selected trait 919 in order to refine the filter 128 and restrict the current cohort 912. It is assumed that the subsequent selected trait 919 will restrict the current entities 404 or modules 406 of the filter 128; however, it is contemplated that the user may override this logical AND operation and utilize a logical OR function for subsequent trait observations 408.

As an illustrative example, the user might choose one of the one-hop linkages 914 corresponding to the entities 404 associated with the selected trait 905 like age 35-40 or male. Continuing with the ICD9 breast cancer example, the link trait step 922 would link the first selected ICD9 trait (the selected trait 905) with the subsequently selected age or gender trait observations 408 (the subsequent selected trait 919). The link trait step 922 would combine both the selected trait 905 and the subsequent selected trait 919 to further refine the filter 128 for only breast cancer diagnoses for patients between the age of 35-40 or that were male.

As a second illustrative example, the user might choose one of the one-hop linkages 914 corresponding to the modules 406 associated with the selected trait 905 like diagnosis date 2007. Continuing with the ICD9 breast cancer example, the link trait step 922 would link the first selected ICD9 trait (the selected trait 905) with the subsequently selected date trait (the subsequent selected trait 919). The link trait step 922 would combine both the selected trait 905 and the subsequent selected trait 919 to further refine the filter 128 for only breast cancer diagnoses in 2007.

As a third illustrative example, the user might choose one of the one-hop linkages 914 corresponding to linkages 608 to the modules 406 or trait observations 408 associated with the selected trait 905 like treatment type: surgery. Continuing with the ICD9 breast cancer example, the link trait step 922 would link the selected ICD9 trait (the selected trait 905) with the subsequently selected pointer trait (the subsequent selected trait 919). The link trait step 922 would combine both the selected trait 905 and the subsequent selected trait 919 to further refine the filter 128 for only breast cancer diagnoses treated by surgery.

The link trait step 922 is coupled to the query metadata step 906. Once the user selects the subsequent selected trait 919, and the selected trait 905 and subsequent selected trait 919 are linked in the link trait step 922, the query metadata step 906 will query the schema definition language 126 in a similar manner to that discussed above.

Once the query metadata step 906 has queried the schema definition language 126, the associate trait step 908 can operate in a similar manner to that described above with the exception that all selected trait 905 are used and operate like a logical AND function. Likewise, the calculate step 910 can calculate the one-hop linkages 914 for the subsequent selected trait 919 in a similar manner to that discussed above and return the current cohort 912 by utilizing the schema definition language 126 to query the physical tables 218 of the operational data store 206 in a similar manner as described above.

Figure 10:
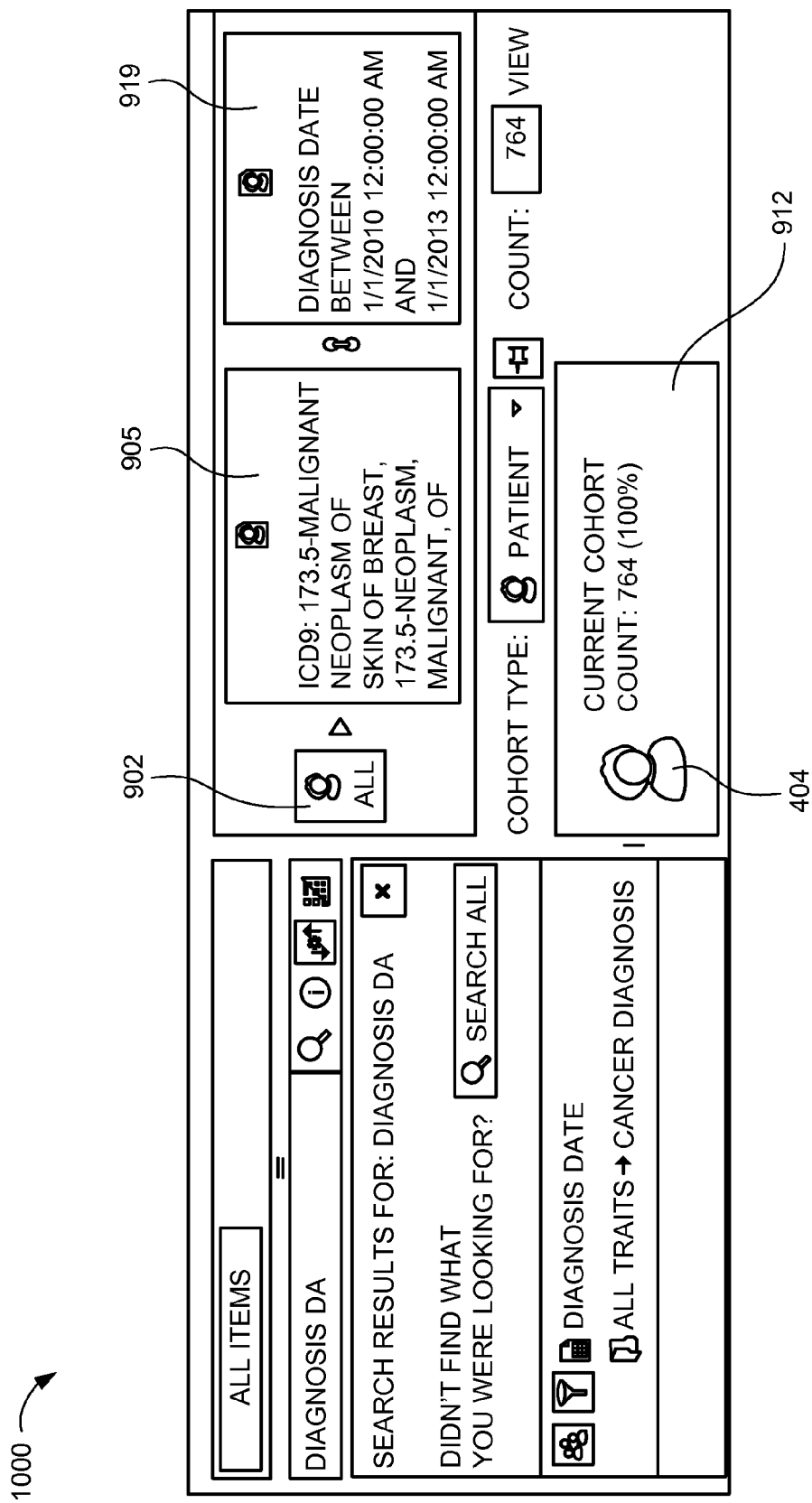
FIG. 10 presents a screenshot of the filter as implemented in the Business Intelligence tools.

Referring now to FIG. 10, therein is shown a screenshot 1000 of the filter 128 as implemented in the Business Intelligence tools 126. The screenshot 1000 depicts an example of the selected trait 905 linked to the subsequent selected trait 919. The subsequent selected trait 919 can be linked to the selected trait 905 as a second trait observations 408 with which to filter the total cohort 902. The link can represent a logical AND requirement; however, it is contemplated that the user may toggle the link icon to invoke a logical OR filtering of the total cohort 902.

The total cohort 902 is shown as the starting cohort for the filter 128. The selected trait 905 is shown to be an ICD9 value filtered for breast cancer. The selected trait 905 is linked contextually to the subsequent selected trait 919.

The subsequent selected trait 919 is shown to be a diagnosis date that is filtered to return dates between Jan. 1, 2010 and Jan. 1, 2013. The current cohort 912 is depicted as a group of the entities 404 along with the number of the entities 404 within the current cohort 912.

Figure 11:
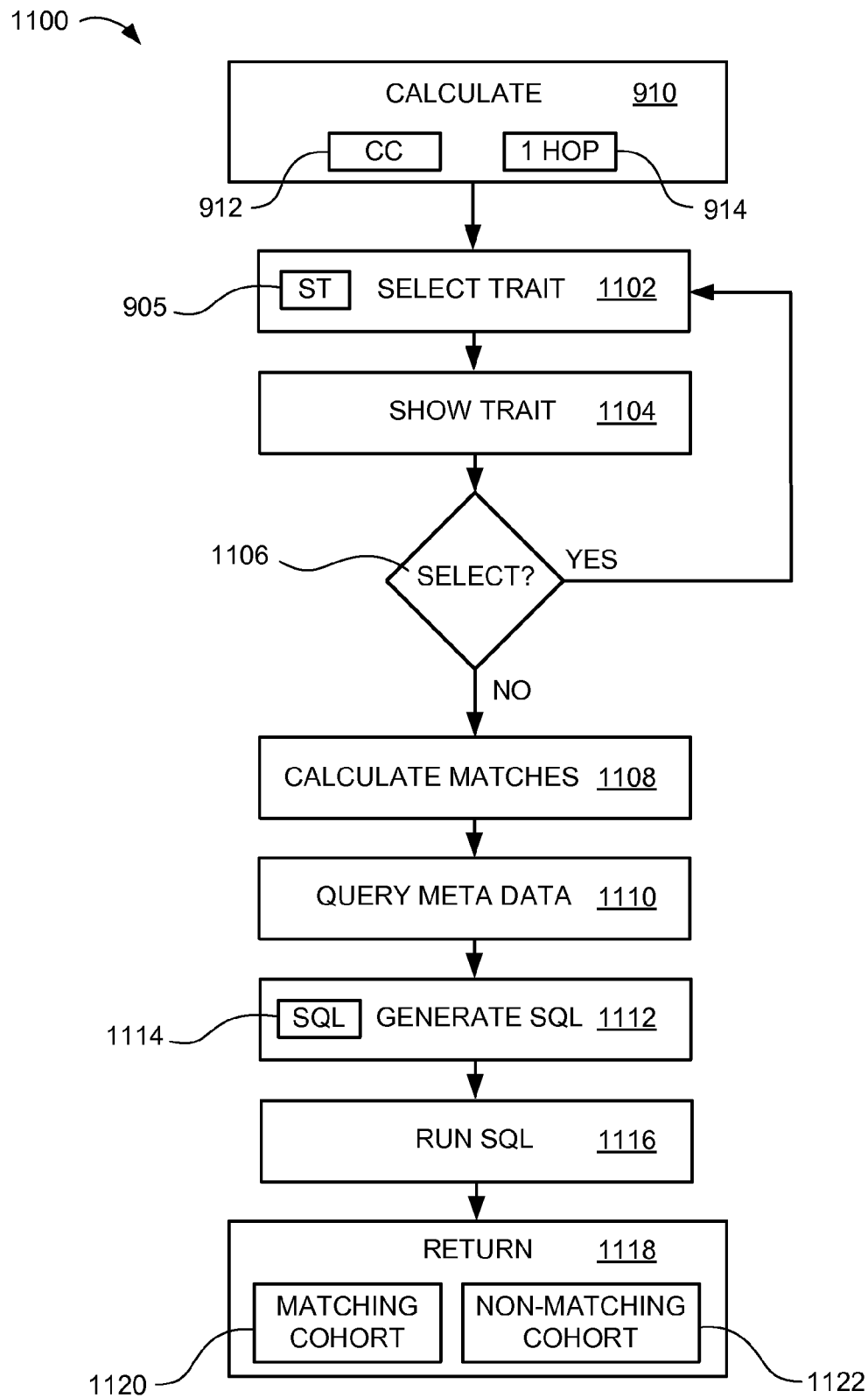
FIG. 11 presents an exemplary control flow for filtering a cohort utilizing a pattern according to an embodiment of the invention.

Referring now to FIG. 11, therein is shown an exemplary control flow 1100 for filtering a cohort utilizing a pattern according to an embodiment of the invention. The exemplary control flow 1100 can be another or further exemplary illustration of how the filter 128 of FIG. 1 operates against the schema definition language 126 of FIG. 1. The metadata 302 of the schema definition language 126 can be referenced by utilizing the metadata tables 300 of FIG. 3, the schema definition model table 500 of FIG. 5, the schema definition model 400 of FIG. 4, or a combination thereof.

This presents yet another method for identifying classes of the entities 404 of FIG. 4 and by scanning the operational data store 206 of FIG. 2, looking for entities 404 who match a particular series of trait observations 408 of FIG. 4 that correspond to clinical events. Users can select trait observations 408, as the selected trait 905, to define clinical patterns and use the Business Intelligence tools 134 of FIG. 1 to identify the entities 404 who match the clinical pattern and who do not match the clinical pattern.

When the operational data store 206 is populated a total cohort 902 of FIG. 9 will be available. The total cohort 902 can include all of the entities 404 represented within the operational data store 206. The control flow 1100 can operate from the total cohort 902 or from the current cohort 912 calculated by the calculate step 910. In this illustrative example, the calculate step 910 providing the current cohort 912 will be used to further refine the filter 128 by using the control flow 1100 for filtering the current cohort 912 based on a pattern.

Coupled to the calculate step 910 is a select trait step 1102 where trait observations 408 can be selected as the selected trait 905. The trait observations 408 that a user can select include the one-hop linkages 914 but can also include unrelated trait observations 408. Once the user selects the selected trait 905, the Business Intelligence tools 134 will feed back the trait and the current cohort 912 in a show trait module 1104 coupled to the select trait step 1102. The user then has the option of selecting another trait in a select option 1106 coupled to the show trait module 1104. If the user does want to select more trait observations 408 the select option 1106 will bring the user to the select trait step 1102 and the user can select a subsequent trait. In this way the user can select trait observations 408 that correspond to clinical events and define a pattern with which to restrict the filter 128.

Continuing with the health care field example utilized above, suppose a user wishes to identify which appendectomy patients were readmitted to the hospital within 30 days of discharge. The user can select the trait observations 408 for appendectomy and the Business Intelligence tools 134 tools can finds all entities 404 who had an appendectomy utilizing the control flow 900 of FIG. 9. Once all the entities 404 correlated with the appendectomy trait observations 408 have been identified in the current cohort 912, the user can create a new clinical pattern beginning in select trait step 1102. The user can select the trait observations 408 for a hospital discharge followed by the trait observations 408 for a hospital admission. The trait observations 408 for the hospital admission can be restricted by the trait observations 408 indicating that the admission occurred within 30 days of the discharge. This example clinical pattern would involve selecting two trait observations 408 (discharge and admission) coupled with selecting a restriction on the one-hop linkages 914 for a maximum of 30 days apart. As mentioned above, the one-hop linkages 914 are unselected trait observations 408 belonging to the same modules 406 of FIG. 4 or entities 404 associated with the selected trait 905.

The user saves the pattern with the name—"Appendectomy readmits within 30 days".

If the user has defined the clinical pattern by selecting the trait observations 408 that correspond to a clinical pattern, the user can select a calculate matches step 1108 as well as save the clinical pattern. The calculate matches step 1108 is coupled to a query metadata step 1110 that references the schema definition language 126 to determine the links 608 of FIG. 6 and the location of the physical tables 218 of FIG. 2 that contain the selected traits 905.

The query metadata step 1110 is coupled to a generate SQL step 1112. The generate SQL step 1112 can utilize the relationships and locations of the physical tables 218 returned from the schema definition language 126 in the query metadata step 1110 to automatically generate SQL instructions 1114 to query the physical tables 218 of the operational data store 206.

A run SQL step 1116, coupled to the generate SQL step 1112, can run the SQL instructions 1114 automatically generated from the generate SQL step 1112 to query the physical tables 218 of the operational data store 206. Coupled to the run SQL step 1116 is a return step 1118. The return step 1118 can return a matching cohort 1120 and a non-matching cohort 1122.

The matching cohort 1120 can be the entities 404 that correspond to the selected trait 905 as a clinical pattern. The non-matching cohort 1122 can be the entities 404 that do not correspond to the selected trait 905 as a clinical pattern.

The matching cohort 1120 and the non-matching cohort 1122 can be saved for later processing or further restriction by the Business Intelligence tools 134. When the return step 1118 returns the matching cohort 1120, the user can view the details of the entities 404 within the matching cohort 1120. For example, the user can view the IDs and the can view when the matches to the clinical pattern defined by the selected trait 905 occurred.

Figure 12:
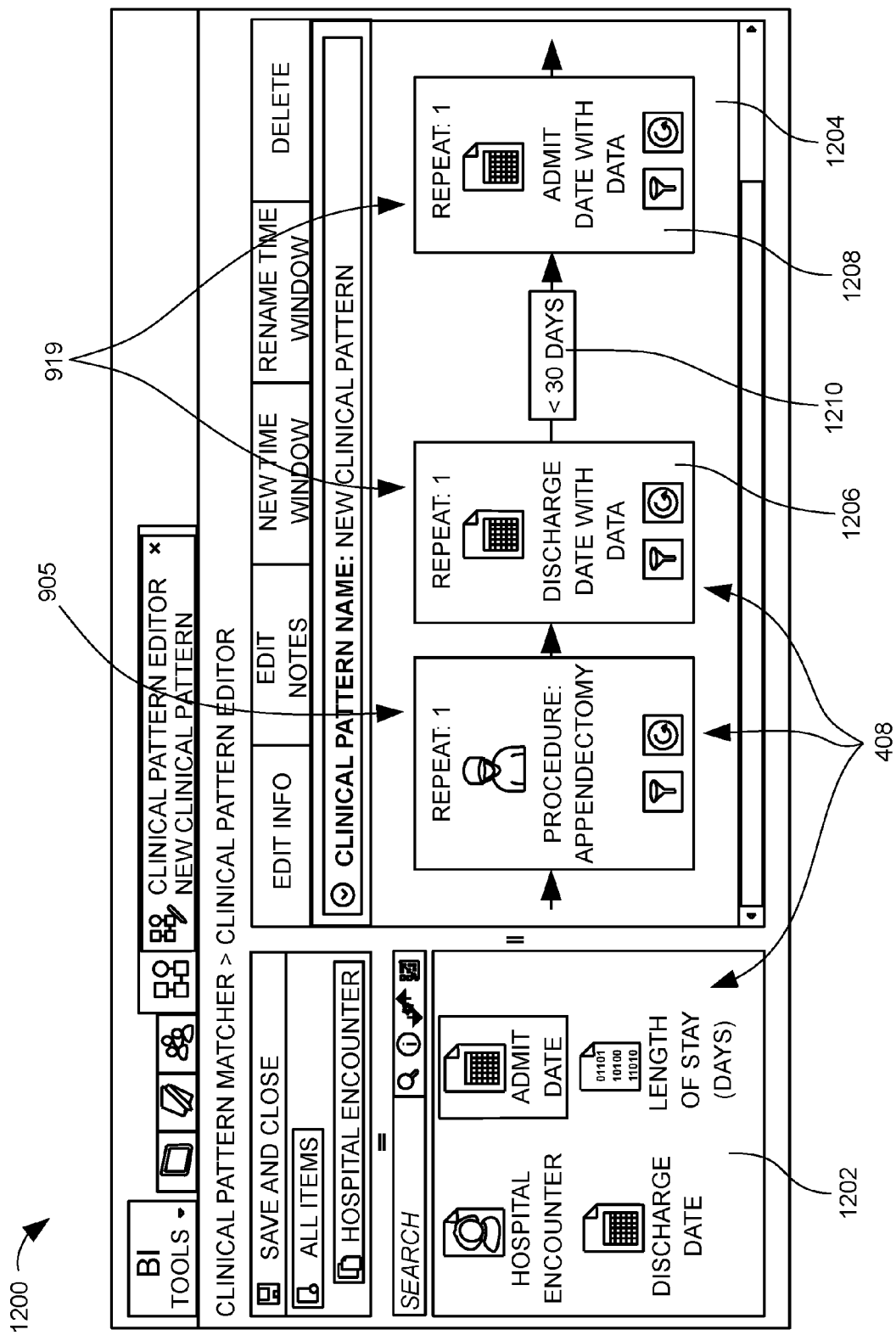
FIG. 12 presents a screenshot of the filter as implemented in the Business Intelligence tools.

Referring now to FIG. 12, therein is shown a screenshot 1200 of the filter 128 of FIG. 1 as implemented in the Business Intelligence tools 126 of FIG. 1. The screenshot 1200 depicts an example of the trait observations 408. The trait observations 408 can be displayed for a user to select in a selection box 1202.

The trait observations 408 that the user selects can be shown in a pattern box 1204. The selected trait 905 along with the subsequent selected traits 919 can be shown linked together in the pattern box 1204. The selected trait 905 can, for example, be a treatment or procedure filtered for an appendectomy.

A first subsequent selected trait 1206 can, for example, be a discharge. A second subsequent selected trait 1208 can be, for example, a readmission. A pattern filter 1210 can be included to restrict the return of the first subsequent selected trait 1206 and the second subsequent selected trait 1208 to less than 30 days of each instance of the trait observations 408. In other words, the pattern filter 1210 can restrict the entities 404 of FIG. 4 returned to the entities 404 that had an appendectomy, were discharged, and were readmitted within thirty days of discharge.

Figure 13:
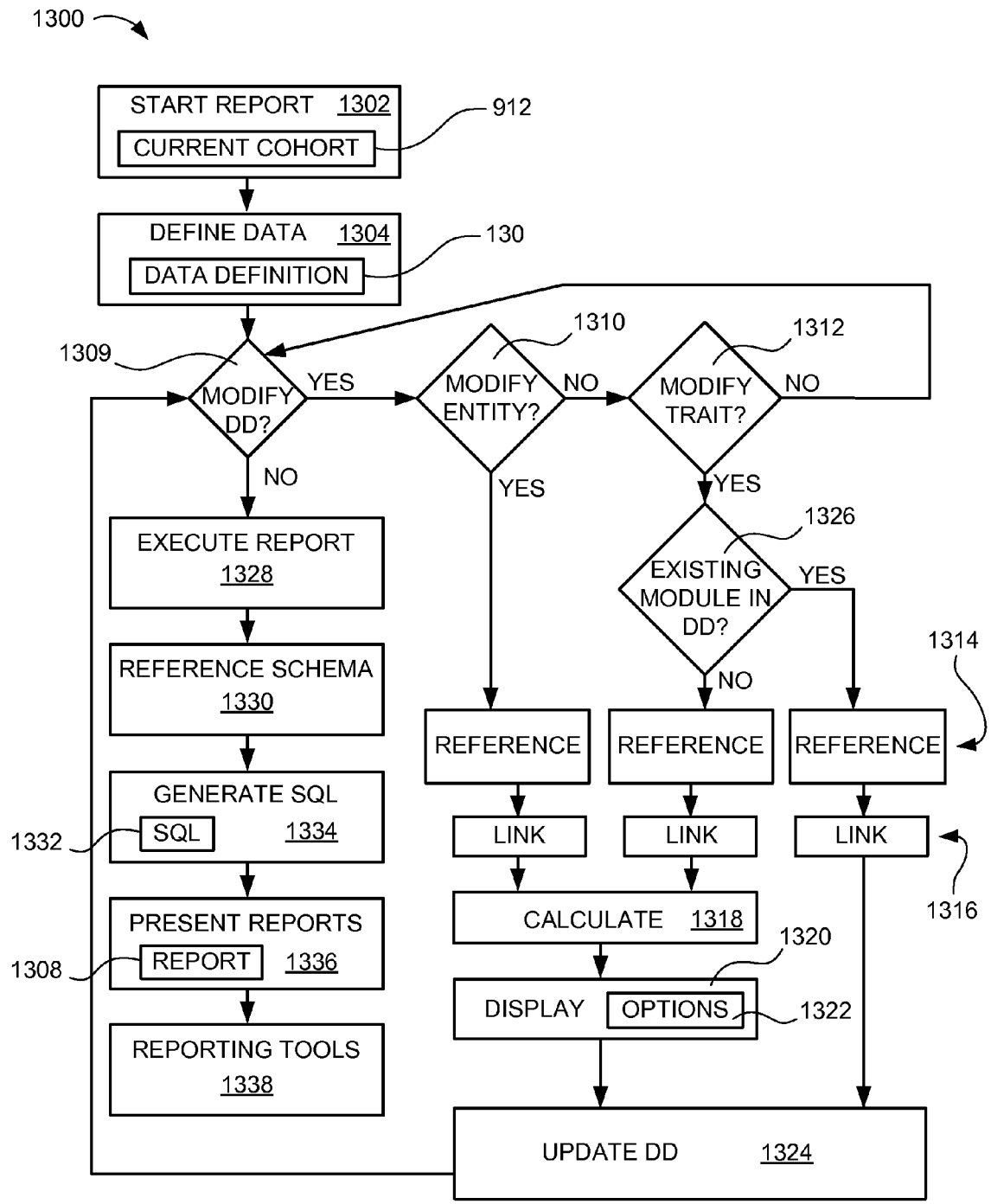
FIG. 13 presents an exemplary control flow for generating a report according to an embodiment of the invention.

Referring now to FIG. 13, therein is shown an exemplary control flow 1300 for generating a report according to an embodiment of the invention. The exemplary control flow 1300 can be an exemplary illustration of how the report data definition 130 of FIG. 2 operates against the schema definition language 126 of FIG. 1. The metadata 302 of the schema definition language 126 can be referenced using the metadata tables 300 of FIG. 3, the schema definition model table 500 of FIG. 5, the schema definition model 400 of FIG. 4, or a combination thereof.

Once the operational data store 206 of FIG. 2 is populated, users are able to report on any of the entities 404 of FIG. 4 within the operational data store 206. The users can define the report data returned. The Business Intelligence tools 134 of FIG. 1 utilize the metadata 302 of the schema definition language 126 to construct the report data definition 130 defined in terms of the entities 404, modules 406, and trait observations 408 of FIG. 4. The Business Intelligence tools 134 executes the report data definition 130 to extract the data 203 of FIG. 2 from the operational data store 206 and presents the results through one or more spreadsheets. Users also view and summarize the spreadsheet data through various report viewers described below in greater detail with regard to FIG. 15.

The report data definition 130 is initiated in a start report step 1302. The start report step 1302 includes the current cohort 912, which the report data definition 130 can operate against. It is contemplated that the total cohort 902 of FIG. 9, matching cohort 1120 of FIG. 11, or even the non-matching cohort 1122 of FIG. 11 can be used by the report data definition 130 to operate against; however, for the sake of illustration, the current cohort 912 is shown.

Coupled to the start report step 1302 is a define data step 1304. The define data step 1304 includes the report data definition 130. The report data definition 130 specifies which entities 404 and trait observations 408 are to be included in a report 1308. The report data definition 130 includes the default entities 404 and trait observations 408. The default entities 404 are the current cohort 912 (or any currently selected cohort), while the default trait observations 408 are the entities 404 IDs and the trait observations 408 used to select the entities 404 as described above in greater detail with regard to FIGS. 9 and 11.

Once the report data definition 130 is created and defined with the default trait observations 408 and entities 404 the user has the option to modify the report data definition 130 in a modify option 1309 coupled to the define data step 1304. If the user wishes to change the report data definition 130 a modify entity option 1310 or a modify trait option 1312, coupled to the modify option 1309 can be selected.

If either the modify entity option 1310 or the modify trait option 1312 are selected by the user, the schema definition language 126 will be referenced by the Business Intelligence tools 134. When the user selects to modify the entities 404 within the report data definition 130, the user will select the modify entity option 1310.

If the user decides to modify the entities 404 by adding an entity a reference step 1314 will reference the schema definition language 126 and determine all the links 608 of FIG. 6 to other entities 404, this is especially important when adding entities 404 that are sub entities of the current cohort 912. The links 608 are determined in a link step 1316 coupled to the reference step 1314.

Once the links 608 are determined between the additional entities 404 and the previous entities 404 the one-hop linkages 914 of FIG. 9 are calculated in a calculate step 1318. The one-hop linkages 914 can be the trait observations 408 that correspond to the newly selected entities 404. That is, the one-hop linkages 914 are trait observations 408 the newly added entities 404 are associated with. The modules 406 can also be returned as one-hop linkages 914. When the newly added entities 404 are pointed to by other modules 406 or entities 404 or, in the alternative, when the newly added entities 404 point to other modules 406 or entities 404, these pointed at or pointed to modules 406 or entities 404 can be returned as one-hop linkages 914.

The calculate step 1318 is coupled to a display step 1320 that can display options 1322. When entities 404 are appended, added, or linked to the report data definition 130 the user will be provided with the options 1322. The options 1322 include longitudinal options, such as first, last or all observations. The options 1322 can further include filtering options, such as filtering based on the type of trait included in the report. The filtering options will only keep results which meet the filter criteria. The options 1322 further include constraint options, such as limiting, non-limiting. The constraint option semantics are equivalent to SQL inner joins vs. outer joins.

After the options 1322 have been provided to the user an update step 1324 will update the report data definition 130 with the newly required entities 404 and their links 608 to the current cohort 912. When adding trait observations 408 to the report data definition 130 the Business Intelligence tools 134 utilize a similar flow.

When a user wishes to modify trait observations 408 that that the report 1308 will display the modify trait option 1312 can be selected. The Business Intelligence tools 134 will determine whether the trait observations 408 that the user wishes to add belong to modules 406 currently in the report data definition 130 within a determination option 1326. If the modules 406 are not currently part of the report data definition 130 the reference step 1314 is used to reference the schema definition language 126. The links 608 are calculated in the link step 1316 and finally the one-hop linkages 914 is calculated in the calculate step 1318.

The one-hop linkages 914 can be the other unselected trait observations 408 that correspond to the entities 404 and modules 406 that the trait observations 408 added by the user correspond to. That is, the one-hop linkages 914 are un-added traits from the same modules 406 and entities 404 that the added trait observations 408 are associated with. Along with calculating un-added trait observations 408, the calculate step 1318 can also return the modules 406 and entities 404 as one-hop linkages 914. When the modules 406 and entities 404 associated with the selected trait 905 are pointed to by other unassociated modules 406 or entities 404, these unassociated modules 406 or entities 404 can be returned as one-hop linkages 914. That is to say, when the target entity type 512 or target module type 514 of FIG. 5 having any trait observations 408 that include a data pointer to the modules 406 or entities 404 associated with the trait observations 408 added by the user the modules 406 and entities 404 associated with the trait observations 408 having the data pointer will be returned as one-hop linkages 914.

In a similar manner to the addition of the entities 404 described immediately above, the display step 1320 displays the options 1322 to the user. The options 1322 displayed when adding the entities 404 and the modules 406 can be the same; however, it is contemplated that additional options or options unique to the entities 404 or modules 406 can be displayed differently and dependent upon which is being added.

After the options 1322 have been provided to the user the update step 1324 will update the report data definition 130 with the newly required modules 406 and their links 608 to the current cohort 912 and the modules 406 therein. When the determination option 1326 is invoked and determines that the trait observations 408 are associated to modules 406 already within the report data definition 130, the reference step 1314 simply references the schema definition language 126 and the link step 1316 determines the links 608 required for incorporating the trait observations 408 into the report data definition 130.

If the trait observations 408 are associated with modules 406 already within the report data definition 130 the calculate step 1318 and the display step 1320 do not need to be invoked to calculate the one-hop linkages 914 or display the options 1322. The update step 1324 can be invoked to update the report data definition 130 and return the user to the modify option 1309.

Continuing from the ICD9 breast cancer example utilized above, the user may wish to report on quality trait observations 408 corresponding to molecular experiment modules 406 run on tumor sample entities 404 for cancer patients returned as the current cohort 912, but stratified by the trait observations 408 indicating the type of breast cancer. Here, the user simply adds the trait observations 408 "Cel File Quality" and "Triple Negative" to the report data definition 130. The schema definition language 126 is referenced to provide the links 608 for the breast cancer diagnosis trait observations 408 to their diagnosing tumor entities 404 and also properly link to the molecular experiment modules 406 run against these tumor entities 404 when adding the Cel File Quality trait observations 408. Because the Triple Negative trait observations 408 are a member of the Cancer Diagnosis modules 406 already included within the report data definition 130.

When the user no longer wishes to modify the report data definition 130 the user may execute the report within an execute step 1328 coupled to the modify option 1309. The schema definition language 126 can be referenced to determine the location of the physical tables 218 within the operational data store 206 that contain the trait observations 408, modules 406, and entities 404 within the report data definition 130 by a reference schema step 1330 coupled to the execute step 1328.

SQL instructions 1332 can be automatically generated by a generate SQL step 1334 coupled to the reference schema step 1330. The SQL instructions 1332 can be generated based on the information gathered from the reference schema step 1330 because the location of the physical tables 218 and the links 608 therebetween for the data 203 requested can be determined from the schema definition language 126.

Once the SQL instructions 1332 is run on the operational data store 206, the report 1308 can be presented as a spreadsheet to the user in a presentation step 1336, coupled to the generate SQL step 1334. The report 1308 can be filtered, displayed and analyzed in a reporting step 1338 coupled to the presentation step 1336. The reporting step 1338 is discussed in greater detail below with regard to FIG. 15.

As an example the reporting step 1338 can provide a pivot table reporting tool and prompt the user to populate the values and dimensions of the pivot table with the data 203 extracted with the report data definition 130.

Figure 14:
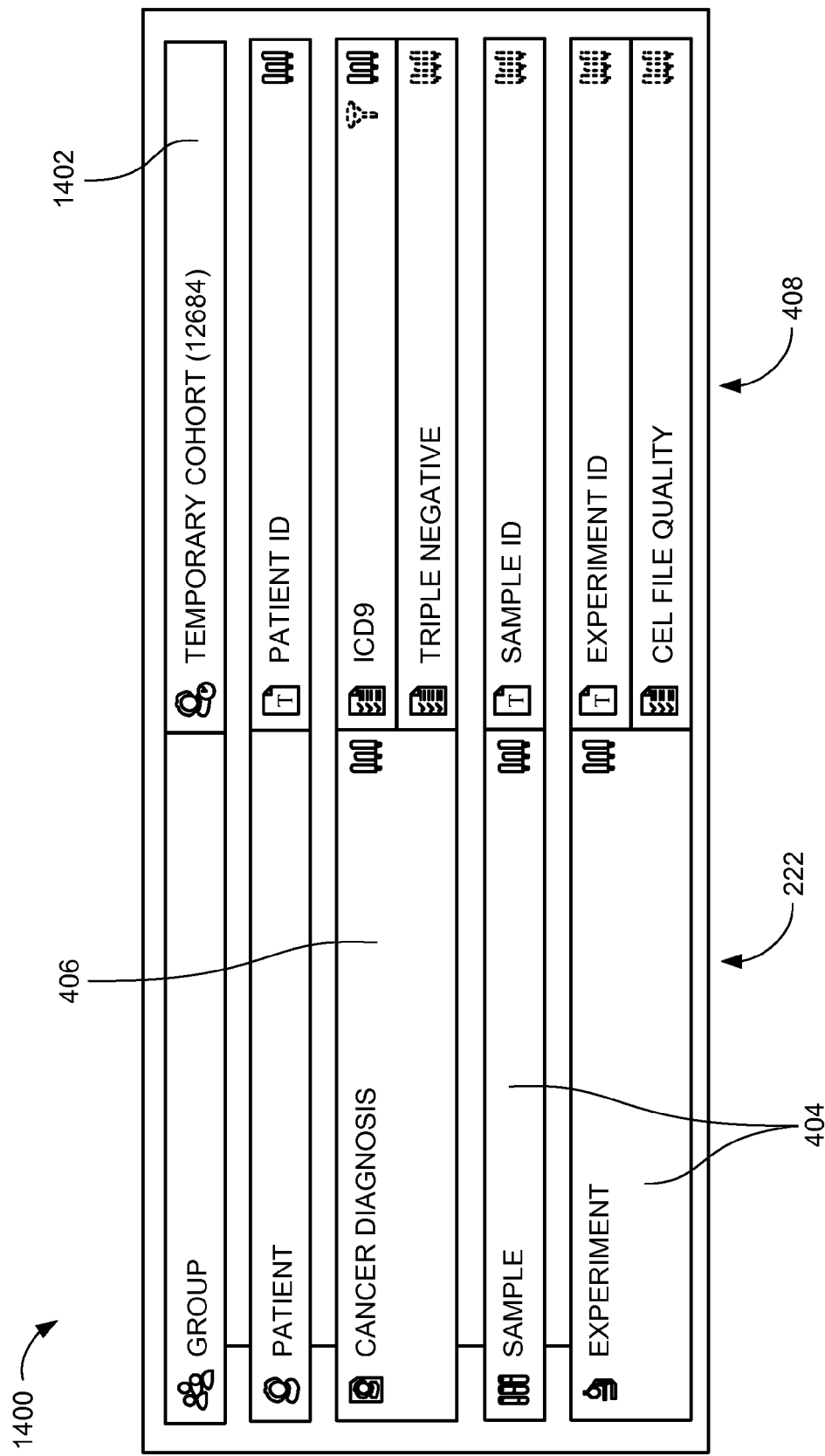
FIG. 14 presents a screenshot of the report data definition as implemented in the Business Intelligence tools.

Referring now to FIG. 14, therein is shown a screenshot 1400 of the report data definition 130 of FIG. 1 as implemented in the Business Intelligence tools 126 of FIG. 1. The screenshot 1400 depicts an example of the traits 222 along with the trait observations 408 correlated thereto.

The trait observations 408 included by default can include the patient ID and the trait observations 408 that were used to filter the entities 404 of FIG. 4. As an illustrative example, the trait observations 408 that are the defaults in the screenshot 1400 are patient ID and ICD9.

To generate a report for a temporary cohort 1402, a user may select other trait observations 408 that should be included for analysis. As an example, the user can select Cel File Quality and Triple Negative. As depicted, the Business Intelligence tools 126 can include the entities 404 corresponding to the newly added trait observations 408.

For the trait observations 408 Cel File Quality the entities 404 Experiment and Sample can be added along with their corresponding trait observations 408 Experiment ID and Sample ID. As is further depicted the trait observations 408 for Triple Negative already have the modules 406 included by default. Specifically, cancer diagnosis was already included as the module 406 corresponding to the ICD9 trait observation 408.

Figure 15:
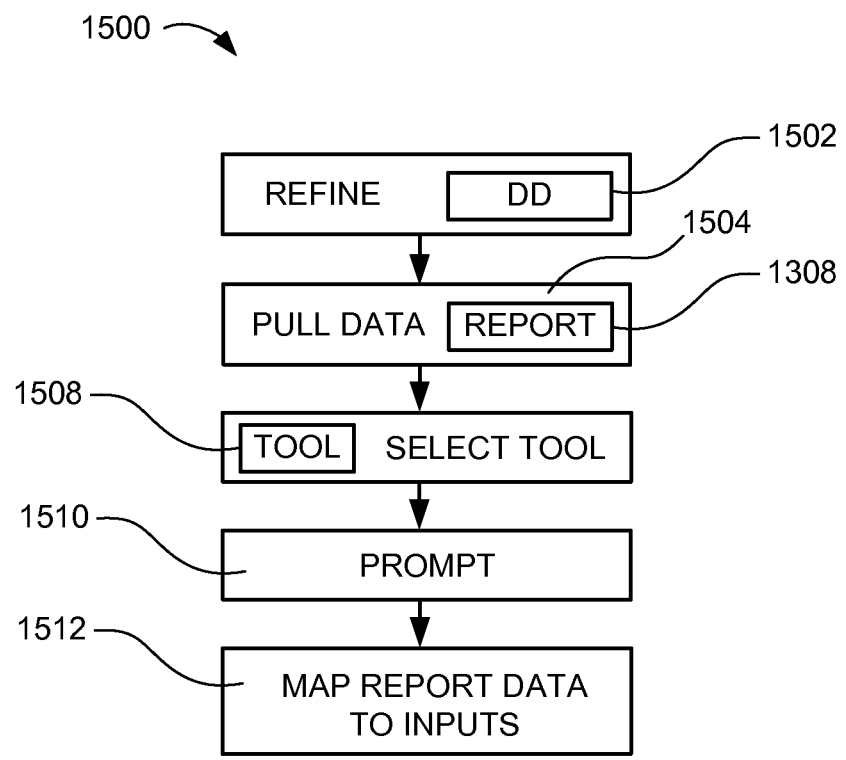
FIG. 15 presents a control flow for analyzing a report according to an embodiment of the invention.

Referring now to FIG. 15, therein is shown a control flow 1500 for analyzing a report according to an embodiment of the invention. The control flow 1500 depicts a portion of the steps from the previous control flow 1300 of FIG. 13 with additional steps for analyzing the report 1308 of FIG. 13.

As depicted a refine step 1502 can be coupled to a pull data step 1504. The refine step 1502 and the pull data step 1504 can comprise the steps of the control flow 1300. For example, the refine step 1502 can comprise the define data step 1304, the modify option 1309, the modify entity option 1310, the modify trait option 1312, the reference step 1314, the link step 1316, the calculate step 1318, the display step 1320, and the update step 1324 of FIG. 13 in order to refine or modify the report data definition 130 of FIG. 1.

The pull data step 1504 can comprise the steps execute step 1328, reference schema step 1330, and generate SQL step 1334 of FIG. 13 to pull the data 203 of FIG. 2 within the report 1308 and display the report 1308 to a user. Once the report 1308 is pulled in the pull data step 1504, a tool select step 1506 coupled to the pull data step 1504 can prompt the user to select an analysis tool 1508.

The tool select step 1506 can include analysis tool selections such as ANOVA (One Way) tools, ANOVA (Two Way) tools, Contingency tools, Cox Regression tools, Cox Regression (Multiple Control Variables) tools, Kaplan Meier (Two Dates) tools, K-Means Clustering tools, LiMMA tools, Logistic Regression tools, Mann Whitney tools, One Sample t-test tools, and other analysis tools. Once the analysis tool 1508 is selected in the tool select step 1506, the Business Intelligence tools 134 of FIG. 1 can prompt the user to select inputs required for the analysis tool 1508 to run. The inputs can be solicited within a prompt step 1510 coupled to the tool select step 1506.

Once the user defines the inputs, the user maps the data 203 from the report 1308 to the inputs in a map step 1512. Once the data 203 is mapped to the analysis tool 1508 inputs, the Business Intelligence tools 134 will execute the analysis and display the analysis to the user. Continuing with the ICD9 breast cancer example above, suppose the user wishes to compare and analyze survival time trait observations 408 of FIG. 4 for breast cancer patient entities 404 of FIG. 4, grouped by the various treatment protocol trait observations 408 of FIG. 4 administered to the patient entities 404. The user refines the report data definition 130 to include the trait observations 408 required to complete the analysis; namely—age at diagnosis trait observations 408, survival time trait observations 408, treatment protocol trait observations 408 and a flag trait observations 408 indicating whether the patient passed away from the breast cancer.

The report 1308 is pulled in the pull data step 1504. The user can then select the analysis tool 1508 Cox Regression in the tool select step 1506. The user maps the data 203 from the report 1308 the inputs in the map step 1512 and executes the analysis. The Business Intelligence tools 134 preforms the analysis and presents the results to the user in various formats such as a visual Kaplan Meier curve backed by a statistical comparison of each pair of treatment protocols.

The control flows and block diagrams in the Figures described above illustrate the architecture, functionality, and operation of possible implementations of systems, methods and computer program products according to various embodiments of the present invention. In this regard, each block in the control flows or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Advantageously, embodiments of the invention provide techniques for providing a schema definition language at a higher level of abstraction and providing a platform to interface with the schema definition language to enable Business Intelligence tools to utilize an operational data store with lower cost, and shorter time frame. The schema definition language enables the Business Intelligence tools to operate at a higher level of abstraction so the tools no longer have to be changed when underlying database evolves. Database evolution is easy and non-disruptive when utilizing the schema definition language of the present invention.

The resulting processes and configurations are straightforward, cost-effective, uncomplicated, highly versatile, accurate, sensitive, and effective, and can be implemented by adapting known components for ready, efficient, and economical, application, and utilization.

While the foregoing is directed to embodiments of the present invention, other and further embodiments of the invention may be devised without departing from the basic scope thereof, and the scope thereof is determined by the claims that follow.

Accordingly, the invention is intended to embrace all such alternatives, modifications, and variations, which fall within the scope of the included claims. All matters hithertofore set forth herein or shown in the accompanying drawings are to be interpreted in an illustrative and non-limiting sense.

What is claimed is:

1. A method comprising:
providing, with a processor from computer memory, a schema definition language defining trait observations linked to an entity and the trait observations grouped together in a module with metadata, and the trait observations being observable facts about the entity;
capturing a schema definition model table, the schema definition model table including a row for each of the trait observations, the schema definition model table including columns for an entity type and module types, the entity type defining the type of the entity the trait observations are linked to, the module types defining the type of the module the trait observations are linked to, and the schema definition model table including cells containing the metadata;
generating, in an operational data store, separate physical tables for each of the module types within the schema definition model table, the separate physical tables including columns for each of the trait observations in the schema definition model table, the module and the entity having a link therebetween based on at least one of the trait observations; and
populating the separate physical tables with data in accordance with the metadata.

2. The method of claim 1, further comprising referencing the metadata of the schema definition language to locate a selected trait within the separate physical tables and determine whether the separate physical tables for the module or the entity includes the selected trait.

3. The method of claim 2, further comprising referencing the metadata of the schema definition language to locate the separate physical tables and determine whether the separate physical tables for the module or the entity includes a subsequent selected trait only if the separate physical tables for the module or the entity included the selected trait.

4. The method of claim 1, further comprising determining the trait observations are one-hop linkages if the trait observations are grouped within the same module as a selected trait.

5. The method of claim 1, further comprising:
classifying the entity in a matching cohort when a clinical pattern of selected traits corresponds with the trait observations; or
classifying the entity as a non-matching cohort when the clinical pattern of the selected trait does not correspond with the trait observations.

6. The method of claim 1, further comprising:
determining whether the module is associated with a report data definition; and
referencing the schema definition language if the module is not associated with the report data definition.

7. The method of claim 1, wherein populating the separate physical tables includes referencing the metadata of the schema definition language and determining whether the data is a proper data type for the trait observations.

8. A non-transitory computer readable medium, useful in association with a processor, including instructions configured to:
provide a schema definition language defining trait observations linked to an entity and the trait observations grouped together in a module with metadata, and the trait observations being observable facts about the entity;
capture a schema definition model table, the schema definition model table including a row for each of the trait observations, the schema definition model table including columns for an entity type and module types, the entity type defining the type of the entity the trait observations are linked to, the module types defining the type of the module the trait observations are linked to, and the schema definition model table including cells containing the metadata;
generate separate physical tables for each of the module types within the schema definition model table, the separate physical tables including columns for each of the trait observations in the schema definition model table, the module and the entity having a link therebetween based on at least one of the trait observations; and
populate the separate physical tables with data in accordance with the metadata.

9. The non-transitory computer readable medium of claim 8, further comprising instructions configured to reference the metadata of the schema definition language to locate a selected trait within the separate physical tables and determine whether the separate physical tables for the module or the entity includes the selected trait.

10. The non-transitory computer readable medium of claim 9, further comprising instructions configured to reference the metadata of the schema definition language to locate the separate physical tables and determine whether the separate physical tables for the module or the entity includes a subsequent selected trait only if the separate physical tables for the module or the entity included the selected trait.

11. The non-transitory computer readable medium of claim 8, further comprising instructions configured to determine the trait observations are one-hop linkages if the trait observations are grouped within the same module as a selected trait.

12. The non-transitory computer readable medium of claim 8, further comprising instructions configured to:
classify the entity in a matching cohort when a clinical pattern of selected traits corresponds with the trait observations; or
classify the entity as a non-matching cohort when the clinical pattern of the selected trait does not correspond with the trait observations.

13. The non-transitory computer readable medium of claim 8, further comprising instructions configured to:
determine whether the module is associated with a report data definition; and
reference the schema definition language if the module is not associated with the report data definition.

14. The non-transitory computer readable medium of claim 8, wherein the instructions configured to populate the separate physical tables further includes instructions configured to reference the metadata of the schema definition language and determine whether the data is a proper data type for the trait observations.

15. A system comprising one or more processors configured to:
provide, with a processor from computer memory, a schema definition language defining trait observations linked to an entity and the trait observations grouped together in a module with metadata, the module being a concrete instance of a record having a start date, having an end date, and resulting in an observation of the trait observations, and the trait observations being observable facts about the entity, capture a schema definition model table, the schema definition model table including a row for each of the trait observations, the schema definition model table including columns for an entity type and module types, the entity type defining the type of the entity the trait observations are linked to, the module types defining the type of the module the trait observations are linked to, and the schema definition model table including cells containing the metadata;

generate, in an operational data store, separate physical tables for each of the module types within the schema definition model table, the separate physical tables including columns for each of the trait observations in the schema definition model table, the module and the entity having a link therebetween based on at least one of the trait observations; and populate the separate physical tables with data in accordance with the metadata.

16. The system of claim 15, the one or more processors are configured to reference the metadata of the schema definition language to locate a selected trait within the separate physical tables and determine whether the separate physical tables for the module or the entity includes the selected trait.

17. The system of claim 16, wherein the one or more processors is configured to reference the metadata of the schema definition language to locate the separate physical tables and determine whether the separate physical tables for the module or the entity includes a subsequent selected trait only if the separate physical tables for the module or the entity included the selected trait.

18. The system of claim 15, wherein the one or more processors is configured to determine the trait observations are one-hop linkages if the trait observations are grouped within the same module as a selected trait.

19. The system of claim 15, wherein the one or more processors is configured to:
classify the entity in a matching cohort when a clinical pattern of selected traits corresponds with the trait observations; or
classify the entity as a non-matching cohort when the clinical pattern of the selected trait does not correspond with the trait observations.

20. The system of claim 15, wherein the one or more processors is configured to:
determine whether the module is associated with a report data definition; and
reference the schema definition language if the module is not associated with the report data definition.

* * * * *